(12) United States Patent
Kwon et al.

(10) Patent No.: US 9,318,733 B2
(45) Date of Patent: Apr. 19, 2016

(54) ELECTRODE ASSEMBLY OF STAIR-LIKE STRUCTURE

(71) Applicant: LG CHEM, LTD., Seoul (KR)

(72) Inventors: Sungjin Kwon, Daejeon (KR); Ki Woong Kim, Daejeon (KR); Soonho Ahn, Seoul (KR); Dong-Myung Kim, Daejeon (KR); Young Hoon Kim, Daejeon (KR); Sunghan Yoon, Daejeon (KR); Seungmin Ryu, Asan-si (KR)

(73) Assignee: LG Chem, Ltd. (KR)

( * ) Notice: Subject to any disclaimer, the term of this patent is extended or adjusted under 35 U.S.C. 154(b) by 64 days.

(21) Appl. No.: 13/837,833

(22) Filed: Mar. 15, 2013

(65) Prior Publication Data

US 2014/0186685 A1 Jul. 3, 2014

Related U.S. Application Data

(63) Continuation of application No. PCT/KR2013/002131, filed on Mar. 15, 2013.

(30) Foreign Application Priority Data

Dec. 27, 2012 (KR) .................. 10-2012-0155155
Feb. 15, 2013 (KR) .................. 10-2013-0016508

(51) Int. Cl.
*H01M 2/18* (2006.01)
*H01M 2/02* (2006.01)
(Continued)

(52) U.S. Cl.
CPC ............ *H01M 2/18* (2013.01); *H01M 10/0459* (2013.01); *H01M 10/052* (2013.01);
(Continued)

(58) Field of Classification Search
CPC . H01M 2/18; H01M 10/052; H01M 10/0585; H01M 10/0459; H01M 10/0413; H01M 10/0436
USPC ......... 429/160, 162, 163, 152, 130, 137, 127; 29/623.1; 219/200
See application file for complete search history.

(56) References Cited

U.S. PATENT DOCUMENTS 2,702,310 A * 2/1955 Kaye .................. H01M 2/1061
429/151
3,442,717 A * 5/1969 Haake et al. .................. 156/290
(Continued)

FOREIGN PATENT DOCUMENTS

CN 1314008 A 9/2001
CN 1363121 A 8/2002
(Continued)

OTHER PUBLICATIONS

Inernational Search Report for Application No. PCT/KR2013/001815 dated Jun. 27, 2013.
(Continued)

*Primary Examiner* — Kenneth Douyette
(74) *Attorney, Agent, or Firm* — Lerner, David, Littenberg, Krumholz & Mentlik, LLP

(57) ABSTRACT

Disclosed herein is an electrode assembly mounted in a battery case of a secondary battery. The electrode assembly is configured to have a structure in which a cathode and an anode are stacked in a state in which a separator plate is disposed between the cathode and the anode. The electrode assembly includes an even number of unit cells, each of the unit cells having a structure in which the uppermost electrode plate and the lowermost electrode plate have the same polarity. The electrode assembly has a stair-like structure.

22 Claims, 11 Drawing Sheets

(51) Int. Cl.
*H01M 10/04* (2006.01)
*H01M 10/02* (2006.01)
*H01M 10/052* (2010.01)
*H01M 10/0585* (2010.01)

(52) U.S. Cl.
CPC ...... *H01M10/0585* (2013.01); *H01M 10/0413* (2013.01); *H01M 10/0436* (2013.01); *Y02E 60/122* (2013.01)

(56) References Cited

U.S. PATENT DOCUMENTS

| | | | |
|---|---|---|---|
| 4,092,464 A * | 5/1978 | Dey | H01M 2/021 429/127 |
| 4,964,877 A * | 10/1990 | Keister et al. | 29/623.1 |
| 5,633,097 A | 5/1997 | Miller | |
| 5,652,074 A | 7/1997 | Larson, III et al. | |
| 6,040,078 A * | 3/2000 | Fauteux | H01M 4/0442 429/163 |
| 6,224,995 B1 * | 5/2001 | Fauteux | H01M 4/0442 29/623.1 |
| 6,498,951 B1 | 12/2002 | Larson et al. | |
| 6,610,443 B2 | 8/2003 | Paulot et al. | |
| 6,946,220 B2 | 9/2005 | Probst et al. | |
| 7,285,334 B1 | 10/2007 | Yamashita et al. | |
| 7,479,349 B2 | 1/2009 | O'Phelan et al. | |
| 7,595,132 B2 | 9/2009 | Kang et al. | |
| 2001/0005561 A1 * | 6/2001 | Yamada et al. | 429/152 |
| 2002/0119367 A1 | 8/2002 | Watanabe et al. | |
| 2002/0160257 A1 * | 10/2002 | Lee et al. | 429/130 |
| 2003/0039883 A1 * | 2/2003 | Notten | H01M 4/043 429/176 |
| 2003/0077509 A1 | 4/2003 | Probst et al. | |
| 2005/0164094 A1 | 7/2005 | Kotato et al. | |
| 2005/0214642 A1 | 9/2005 | Kim et al. | |
| 2006/0172185 A1 | 8/2006 | Mimura | |
| 2006/0269842 A1 | 11/2006 | Ichinose et al. | |
| 2006/0275661 A1 | 12/2006 | Kim et al. | |
| 2006/0286456 A1 | 12/2006 | Fu et al. | |
| 2007/0054180 A1 | 3/2007 | Miyajima et al. | |
| 2007/0059595 A1 | 3/2007 | Endo et al. | |
| 2007/0099078 A1 | 5/2007 | Zhang et al. | |
| 2007/0218355 A1 | 9/2007 | Ryu et al. | |
| 2007/0287064 A1 | 12/2007 | Suzuki et al. | |
| 2008/0137890 A1 | 6/2008 | Petersen et al. | |
| 2009/0075168 A1 | 3/2009 | Lee | |
| 2009/0159582 A1 * | 6/2009 | Chami et al. | 219/200 |
| 2010/0112451 A1 | 5/2010 | Shibutani et al. | |
| 2010/0279161 A1 | 11/2010 | Kang et al. | |
| 2011/0052952 A1 | 3/2011 | Roh et al. | |
| 2011/0183183 A1 * | 7/2011 | Grady et al. | 429/152 |
| 2011/0274955 A1 | 11/2011 | Park et al. | |
| 2011/0287308 A1 | 11/2011 | Kim et al. | |
| 2012/0015223 A1 | 1/2012 | Bhardwaj et al. | |
| 2012/0015236 A1 | 1/2012 | Spare | |
| 2012/0107654 A1 | 5/2012 | Bhardwaj et al. | |
| 2012/0129037 A1 | 5/2012 | Hohenthanner et al. | |
| 2012/0135299 A1 | 5/2012 | Kwon et al. | |
| 2012/0156551 A1 | 6/2012 | Cho | |
| 2012/0183825 A1 | 7/2012 | Lee et al. | |
| 2012/0202105 A1 | 8/2012 | Shinyashiki et al. | |
| 2012/0225345 A1 | 9/2012 | Kim | |
| 2013/0144167 A1 | 6/2013 | Lee et al. | |
| 2014/0093762 A1 | 4/2014 | Goh et al. | |

FOREIGN PATENT DOCUMENTS

| | | |
|---|---|---|
| CN | 1799162 A | 7/2006 |
| CN | 101107736 A | 1/2008 |
| EP | 1309018 A2 | 5/2003 |
| EP | 1326680 A1 | 7/2003 |
| JP | 02-056856 | 2/1990 |
| JP | 06-260209 | 9/1994 |
| JP | 09-082361 | 3/1997 |
| JP | 10-270014 | 10/1998 |
| JP | H10296879 A | 11/1998 |
| JP | 2000133317 A | 5/2000 |
| JP | 2001028275 A | 1/2001 |
| JP | 2001167743 A | 6/2001 |
| JP | 2002199910 A | 7/2002 |
| JP | 2002252023 A | 9/2002 |
| JP | 2003217601 A | 7/2003 |
| JP | 2003234094 A | 8/2003 |
| JP | 2004111219 A | 4/2004 |
| JP | 3611765 B2 | 1/2005 |
| JP | 2005169728 A | 6/2005 |
| JP | 3680797 B2 | 8/2005 |
| JP | 2006127882 A | 5/2006 |
| JP | 2006134604 A | 5/2006 |
| JP | 2006236994 A | 9/2006 |
| JP | 2006-278331 A | 10/2006 |
| JP | 2008021634 A | 1/2008 |
| JP | 2008300141 A | 12/2008 |
| JP | 2009-218105 A | 9/2009 |
| KR | 2020000005813 U | 4/2000 |
| KR | 20-0207948 | 1/2001 |
| KR | 1020010055968 A | 7/2001 |
| KR | 20010104150 A | 11/2001 |
| KR | 20030066960 A | 8/2003 |
| KR | 1020030066960 A | 8/2003 |
| KR | 20040054113 A | 6/2004 |
| KR | 20050020357 A | 3/2005 |
| KR | 20050036466 A | 4/2005 |
| KR | 20060027281 A | 3/2006 |
| KR | 100670492 B1 | 1/2007 |
| KR | 20070066401 A | 6/2007 |
| KR | 1020070075941 A | 7/2007 |
| KR | 1020070099068 A | 10/2007 |
| KR | 20080022915 A | 3/2008 |
| KR | 100829553 B1 | 5/2008 |
| KR | 20080058772 A | 6/2008 |
| KR | 20080095967 A | 10/2008 |
| KR | 10-0866767 B1 | 11/2008 |
| KR | 20090003823 A | 1/2009 |
| KR | 10-0884945 B1 | 2/2009 |
| KR | 20090028243 A | 3/2009 |
| KR | 20090062409 A | 6/2009 |
| KR | 20090097731 A | 9/2009 |
| KR | 100987300 B1 | 10/2010 |
| KR | 20100137290 A | 12/2010 |
| KR | 20110025023 A | 3/2011 |
| KR | 20110105737 A | 9/2011 |
| KR | 20110112241 A | 10/2011 |
| KR | 20110128594 A | 11/2011 |
| KR | 20120060706 A | 6/2012 |
| KR | 20120082808 A | 7/2012 |
| WO | 0072392 A1 | 11/2000 |
| WO | 2012-009423 A1 | 1/2012 |
| WO | 2012053772 A2 | 4/2012 |
| WO | 2013-180378 A1 | 12/2013 |

OTHER PUBLICATIONS

International Search Report for Application No. PCT/KR2013/002118 dated Jun. 28, 2013.
International Search Report for Application No. PCT/KR2013/002127 dated Jun. 27, 2013.
Chinese Office Action for Application No. 201380002792.X dated Apr. 3, 2015.
Machine translation of KR 2003-0066960 (Jang).
International Search Report from PCT/KR2013/002131, dated Jul. 22, 2013.

* cited by examiner

ELECTRODE ASSEMBLY OF STAIR-LIKE STRUCTURE

CROSS REFERENCE TO RELATED APPLICATIONS

This non-provisional application is a Continuation of International Application No. PCT/KR2013/002131 filed on Mar. 15, 2013, which claims the benefit of Korean Patent Application Nos. 10-2012-0155155 filed on Dec. 27, 2012 and 10-2013-0016508 filed on Feb. 15, 2013 filed in Korea. The entire contents of all of the above applications are hereby incorporated by reference.

TECHNICAL FIELD

The present invention relates to an electrode assembly mounted in a battery case of a secondary battery and, more particularly, to an electrode assembly of a stair-like structure.

BACKGROUND ART

With remarkable development of information technology (IT), a great variety of portable information communication devices has been popularized. As a result, in the 21$^{st}$ century, we are moving toward a ubiquitous society in which high-quality information service is possible regardless of time and place.

Lithium secondary batteries are very important to realize such a ubiquitous society. Specifically, lithium secondary batteries, which can be charged and discharged, have been widely used as an energy source for wireless mobile devices. In addition, the lithium secondary batteries have also been used as an energy source for electric vehicles and hybrid electric vehicles, which have been proposed to solve problems, such as air pollution, caused by existing gasoline and diesel vehicles using fossil fuel.

As devices, to which the lithium secondary batteries are applicable, are diversified as described above, the lithium secondary batteries have also been diversified such that the lithium secondary batteries can provide powers and capacities suitable for devices to which the lithium secondary batteries are applied. In addition, there is a strong need to reduce the size and weight of the lithium secondary batteries.

Small-sized mobile devices, such as mobile phones, personal digital assistants (PDAs), digital cameras, and laptop computers, use one or several small-sized, lightweight battery cells for each device according to the reduction in size and weight of the corresponding products.

On the other hand, middle or large-sized devices, such as electric bicycles, electric motorcycles, electric vehicles, and hybrid electric vehicles, use a middle or large-sized battery module (middle or large-sized battery pack) having a plurality of battery cells electrically connected with each other because high power and large capacity are necessary for the middle or large-sized devices.

A cylindrical battery, a prismatic battery, and a pouch-shaped battery, which are classified based on their shapes, are used as a unit cell of a battery module or battery pack. Among these batteries, the pouch-shaped battery, which can be stacked with high integration, has a high energy density per unit weight, is inexpensive, and can be easily modified, has attracted considerable attention.

FIGS. 1A and 1B are exploded perspective views typically showing the general structure of a conventional representative pouch-shaped battery.

Referring to FIG. 1A, a pouch-shaped battery 10 includes a stacked type electrode assembly 20 configured to have a structure in which a plurality of cathodes cut into a predetermined size and a plurality of anodes cut into a predetermined size are sequentially stacked in a state in which a plurality of separators cut into a predetermined size is disposed respectively between the cathodes and the anodes, the stacked type electrode assembly 20 having pluralities of electrode tabs 21 and 22 protruding therefrom, two electrode leads 30 and 31 respectively connected to the electrode tabs 21 and 22, and a battery case 40 to receive the stacked type electrode assembly 20 in a sealed state such that portions of the electrode leads 30 and 31 are exposed outward from the battery case 40.

The battery case 40 includes a lower case 42 having, a depressed receiving part 41, in which the stacked type electrode assembly 20 is located, and an upper case 43 to cover the lower case 42 such that the stacked type electrode assembly 20 is sealed in the battery case 40. The upper case 43 and the lower case 42 are connected to each other by thermal welding in a state in which the stacked type electrode assembly 20 is mounted therein to form an upper end sealed part 44, side sealed parts 45 and 46, and a lower end sealed part 47.

As shown in FIG. 1A, the upper case 43 and the lower case 42 may be configured as separate members. As shown in FIG. 1B, on the other hand, one end of the upper case 43 may be integrally formed at a corresponding end of the lower case 42 such that the upper case 43 and the lower case 42 may be hingedly connected to each other.

Also, as shown in FIGS. 1A and 1B, the pouch-shaped battery is configured to have a structure in which electrode terminals constituted by the electrode tabs and the electrode leads connected to the electrode tabs are formed at one end of the stacked type electrode assembly. Alternatively, a pouch-shaped battery configured to have a structure in which electrode terminals are formed at one end and the other end, opposite to one end, of an electrode assembly may also be manufactured using the above method.

Meanwhile, FIGS. 1A and 1B show the stacked type electrode assembly. Alternatively, the pouch-shaped secondary battery of FIGS. 1A and 1B may be manufactured using a jelly-roll type (wound type) electrode assembly configured to have a structure in which a long sheet type cathode and a long sheet type anode are wound in a state in which a long sheet type separator is disposed between the cathode and the anode or a stacked and folded type electrode assembly configured to have a structure in which a plurality of stacked type electrode assemblies is folded in a state in which a long sheet type separation film is disposed between the respective stacked type electrode assemblies.

DISCLOSURE

Technical Problem

As shown in FIGS. 1A and 1B, the electrode assembly is generally manufactured so as to have an approximately rectangular parallelepiped structure. The electrode assembly is mounted in a battery case to manufacture a pouch-shaped battery having a rectangular parallelepiped structure. A plurality of such pouch-shaped batteries is stacked to constitute a battery pack having a rectangular parallelepiped structure.

However, a device, to which the battery having the rectangular parallelepiped structure or the battery pack having the rectangular parallelepiped structure is applied, is not generally formed in the shape of a rectangular parallelepiped. For example, sides of a smartphone may be curved to improve grip.

In a case in which the battery having the rectangular parallelepiped structure or the battery pack having the rectangular parallelepiped structure is mounted in a device designed so as to have such curved portions, however, space utilization of the device may be lowered.

That is, the curved portions of the device have dead spaces, in which the battery or the battery pack cannot be mounted. Ultimately, such dead spaces lower the capacity of the device per unit volume.

Therefore, the present invention has been made to solve the above problems, and it is an object of the present invention to provide an electrode assembly of a stair-like structure that is capable of maximally improving the capacity of a device per unit volume and a battery including the same.

Meanwhile, in a conventional stacked and folded type electrode assembly including a plurality of stacked type electrode assemblies (hereinafter, referred to as S type electrode assemblies or S type unit cells), the uppermost electrode plate and the lowermost electrode plate of each of which have the same polarity, an odd number of S type electrode assemblies are generally provided.

The capacity of a battery is directly proportional to a loading level. Consequently, the increase of the loading level causes the increase in capacity of the battery. According to the increase of the loading level, however, rate control characteristics of the battery are lowered.

For this reason, it is necessary to design the loading level in consideration of the rate control characteristics of the battery.

In the conventional stacked and folded type electrode assembly as described above, it is possible to increase the capacity of the battery through the increase in number of the S type electrode assemblies having a reduced loading level due to limitations of the loading level.

That is, in a stacked and folded type electrode assembly including 2n−1 S type electrode assemblies (A), it is possible to increase the capacity of the battery through the increase in number of S type electrode assemblies (B) having a lower loading level than the S type electrode assemblies (A) due to limitations of the loading level.

As a result, a stacked and folded type electrode assembly including 2n+1 S type electrode assemblies (B) is manufactured.

In this case, however, efficiency of thickness per unit capacity is reduced in a section in which the number of the S type electrode assemblies is increased from 2n−1 to 2n+1.

In order to solve the above problem, the present invention provides a stacked and folded type electrode assembly including 2n S type electrode assemblies which a higher capacity per unit volume than the conventional stacked and folded type electrode assembly including 2n+1 S type electrode assemblies.

Technical Solution

In accordance with one aspect of the present invention, the above and other objects can be accomplished by the provision of an electrode assembly including an even number of unit cells, each of the unit cells having a structure in which electrode plates having opposite polarities are stacked in a height direction on the basis of a plane in a state in which a separator plate is disposed between the electrode plates, an uppermost electrode plate and a lowermost electrode plate have the same polarity, and electrode tabs protrude from the electrode plates, and a sheet type separation film to cover one major surface and the other major surface of each of the unit cells and sides of the unit cells, which constitute an electrode tab non-formation region, wherein the unit cells are stacked in the height direction on the basis of the plane such that the electrode plates having opposite polarities face each other in a state in which the separation film is disposed between the electrode plates, and the stacked unit cells have different sizes, whereby the electrode assembly has a stair-like structure.

The stack structure of the unit cells may include one or more unit cells and one or more other unit cells having the same size as or different sizes from one or more unit cells.

An even number of unit cells having the same size may be stacked in the direction in which the electrode plates are stacked to form two or more electrode groups, the uppermost and lowermost electrode plates of which have opposite polarities.

The electrode groups may have different sizes and the stack structure of the electrode groups having different sizes may form a stair-like structure including one or more steps, each having a width and a height.

In a case in which n electrode groups having different stack areas are stacked, the stair-like structure may have n steps, where, n is a natural number equal to or greater than 2 and may be properly adjusted in consideration of the capacity of a device or the curvature of the outside of the device.

The electrode plates may have the same size or different sizes. The electrode plates having the different sizes may be electrode plates having different overall widths and/or overall lengths.

The shape of each of the electrode plates is not particularly restricted. For example, each of the electrode plates may be formed in the shape of a parallelepiped. Alternatively, each of the electrode plates may be formed in a polygonal or circular shape in plane.

Specifically, each of the electrode plates may be formed in the shape of a parallelepiped having an overall width, an overall length, and an overall height. The parallelepiped may be formed in a quadrangular shape in plane. In this case, the overall width may be the length of one side from which the electrode tabs protrude and the overall length may be the length of one side from which the electrode tabs do not protrude. In addition, the overall height may be the height of the parallelepiped.

In a more concrete example, each of the electrode plates may be formed in the shape of a rectangular parallelepiped having an overall length, an overall width smaller than the overall length, and an overall height smaller than the overall width, i.e. satisfying the following conditions: overall length>overall width>overall height.

In addition, each of the electrode plates may be formed in the shape of a rectangular parallelepiped having an overall length and an overall width equal to each other and an overall height smaller than the overall width. Alternatively, each of the electrode plates may be formed in the shape of a regular hexahedron having an overall length, an overall width, and an overall height equal to one another.

Each of the electrode plates may have right-angled corners or at least one of the corners of each of the electrode plates may be curved. More specifically, at least one of four corners of each of the electrode plates formed in a quadrangular shape in plane may be curved.

In a case in which at least one of the corners of each of the electrode plates is curved as described above, impact applied to the curved corner of each of the electrode plates is reduced when the electrode assembly is dropped, thereby improving safety.

The electrode tabs protrude from one end of each of the electrode plates. The electrode tabs may have the same size or different sizes. Specifically, at least one selected from among overall widths, overall lengths, and overall heights of the electrode tabs may be different. Alternatively, the electrode tabs may have the same overall width, overall length, and overall height.

More specifically, the electrode tabs of the electrode plates may have the same overall width, overall length, and overall height. Alternatively, at least one selected from among overall widths, overall lengths, and overall heights of the electrode tabs of the electrode plates may be different. In particular, the electrode tabs of the electrode plates may have different overall widths or different overall lengths.

The surface of each of the electrode plates from which the electrode tabs protrude may be referred to as the front of each of the electrode plates and the surface opposite to the front of each of the electrode plates may be referred to as the rear of each of the electrode plates. In addition, surfaces of each of the electrode plates parallel to the plane may be referred to as one major surface and the other major surface of each of the electrode plates. Furthermore, the surface of each of the electrode plates perpendicular to one major surface and the other major surface and parallel to the height direction may be one side surface of each of the electrode plates and the surface opposite to one side surface of each of the electrode plates may be the opposite side surface. One side surface and/or the other side surface may be referred to as sides.

The separator plate may have an adhesion function based on thermal welding. The details of the separator plate are disclosed in Korean Patent Application No. 1999-57312, which has been filed by the applicant of the present application.

Each of the unit cells may be formed by stacking cathode and anode plates having opposite polarities in a state in which the separation film is disposed between the cathode and anode plates.

Each of the unit cells may include a stacked type unit cell. The stacked type unit cell may include a first electrode plate stack configured to have a structure in which a cathode plate, an anode plate, and separator plates are laminated while being stacked such that the cathode plate or the anode plate and one of the separator plates are located at the outermost sides of each of the unit cells.

The stacked type unit cell may include a second electrode plate stack configured to have a structure in which a cathode plate, an anode plate, and separator plates are laminated while being stacked such that the separator plates are located at the outermost sides of each of the unit cells.

The stacked type unit cell may include a third electrode plate stack configured to have a structure in which a cathode plate, an anode plate, and a separator plate are laminated while being stacked in a state in which the separator plate is disposed between the cathode plate and the anode plate such that the cathode plate and the anode plate are located at the outermost sides of each of the unit cells.

The stacked type unit cell may include a fourth electrode plate stack configured to have a structure in which a cathode plate or an anode plate and a separator plate are laminated while being stacked.

The stacked type unit cell may be configured to have a structure in which only first electrode plate stacks are stacked, a structure in which only second electrode plate stacks are stacked, a structure in which only third electrode plate stacks are stacked, a structure in which only fourth electrode plate stacks are stacked, or a structure in which the first, second, third, and fourth electrode plate stacks are combined.

For example, the first electrode plate stack may be configured to have a structure in which a cathode plate, a separator plate, an anode plate, and a separator plate are laminated while being sequentially stacked or a structure in which an anode plate, a separator plate, a cathode plate, and a separator plate are laminated while being sequentially stacked.

The stacked type unit cell may be configured to have a structure in which only the first electrode plate stacks are stacked.

The second electrode plate stack may be stacked at the uppermost end or the lowermost end of the first electrode plate stack.

In the structure in which only the second electrode plate stacks are stacked, a cathode plate or an anode plate may be disposed between the second electrode plate stacks.

A fixing member to more securely maintain the stack structure of the cathode plate, the separator plate, and the anode plate may be added to the first electrode plate stack to the fourth electrode plate stack.

The fixing member is an additional external member different from the first electrode plate stack to the fourth electrode plate stack. The fixing member may be an adhesive tape or a bonding tape to cover a portion or the entirety of the outside of the electrode plate stack.

The outside of the electrode plate stack may include sides, a top, a front, and a rear of the electrode plate stack.

The fixing member may be a portion of the separator plate constituting the electrode plate stack. In this case, the ends of the separator plate may be thermally welded to fix the electrode plate stack. However, the present invention is not limited thereto.

The fixing member may include all members that are capable of fixing the first electrode plate stack to the fourth electrode plate stack.

In a case in which the stacked type electrode assembly is configured to include the first electrode plate stack to the fourth electrode plate stack, it possible to improve productivity and yield as compared with the stacked type electrode assembly configured to have a structure in which the cathode plate, the anode plate, and the separator plate are simply stacked.

In addition, the cathode plate, the separator plate, and the anode plate are laminated in unit of the first electrode plate stack, and therefore, it is possible to minimize expansion in volume of the stacked type electrode assembly due to swelling.

In a case in which the stacked type electrode assembly is configured to include the first electrode plate stack to the fourth electrode plate stack, misalignment of the electrode assembly caused during a folding process is prevented and omission of processing equipment is possible. In addition, it is possible to form the first electrode plate stack to the fourth electrode plate stack using only one laminator. In addition, it is possible to manufacture the stacked type electrode assembly by simple stacking. Consequently, damage to electrodes caused during the folding process may be reduced and electrolyte wettability may be improved. Furthermore, a single-sided organic and inorganic composite separator, e.g. a safety reinforced separator (SRS), may be used as the separator plate exposed outside. Consequently, cell thickness may be decreased and, at the same time, processing cost may be reduced.

Each of the unit cells may be an S type unit cell configured to have a structure in which the uppermost electrode plate and the lowermost electrode plate have the same polarity. The S type unit cell may be classified as an SC type unit cell, the uppermost electrode plate and the lowermost electrode plate of which are cathode plates or an SA type unit cell, the uppermost electrode plate and the lowermost electrode plate of which are anode plates.

In the unit cells having different sizes, the electrode plates of the unit cells may have different overall lengths and/or overall widths.

In addition, the electrode tabs of the unit cells having the same size may have the same overall width, overall length, and overall height. In the unit cells having different sizes, at least one selected from among overall widths, overall lengths, and overall heights of the electrode tabs of the unit cells may be different. In particular, the electrode tabs of the unit cells may have different overall widths or different overall lengths. Even for the unit cells having the same size, the electrode tabs of the unit cells may have different overall widths, overall lengths, and overall heights. Alternatively, the electrode plates of the unit cells may have different overall widths or overall lengths. Even for the unit cells having different sizes, the electrode tabs of the unit cells may have the same overall width, overall length, and overall height.

The surface of each of the unit cells from which the electrode tabs protrude may be referred to as the front of each of the unit cells and the surface opposite to the front of each of the unit cells may be referred to as the rear of each of the unit cells. In addition, surfaces of each of the unit cells parallel to the plane may be referred to as one major surface and the other major surface of each of the unit cells. Furthermore, the surface of each of the unit cells perpendicular to one major surface and the other major surface and parallel to the height direction may be one side surface of each of the unit cells and the surface opposite to one side surface of each of the unit cells may be the opposite side surface. One side surface and/or the other side surface may be referred to as sides.

The unit cells may be stacked such that at least one selected from among the fronts, the rears, and the sides of the unit cells is not aligned or such that the unit cells are not arranged on the same plane. Specifically, the unit cells may be stacked such that only the fronts of the unit cells are arranged on the same plane, such that only the rears of the unit cells are arranged on the same plane, or such that one side surfaces and/or the other side surfaces of the unit cells are arranged on the same plane. Alternatively, the unit cells may be stacked such that all of the fronts, the rears, one side surfaces, and the other side surfaces of the unit cells are not arranged on the same plane.

For example, in a case in which the unit cells are stacked such that all of the fronts, the rears, one side surfaces, and the other side surfaces of the unit cells are not arranged on the same plane, the electrode assembly according to the present invention may be formed in the shape of a frustum of a quadrangular pyramid.

The stack arrangement of the unit cells as described above is merely a concrete example of the present invention, and therefore, the arrangement of the unit cells is not limited to the above example.

At the interface between the stacked unit cells, the cathode and the anode facing each other may have different sizes or areas.

For example, the electrode constituting the uppermost surface of a lower one of the stacked unit cells and the electrode constituting the lowermost surface of an upper one of the stacked unit cells may have different sizes or areas.

A ratio of capacity to area of the cathode and the anode at the interface between the stacked unit cells (N/P ratio) may be equal to or greater than a ratio of capacity to area of the cathode and the anode constituting the unit cell having relatively large area (N/P ratio).

In a case in which the N/P ratio at the interface between the stacked unit cells is lower than the N/P ratio of the cathode and the anode constituting the unit cell having relatively large area, the performance of a lithium secondary battery having the electrode assembly according to the present invention mounted therein may be deteriorated, which is not preferable.

A ratio of the N/P ratio of the cathode and the anode facing at the interface between the unit cells to the N/P ratio of the cathode and the anode constituting each of the unit cells may be 1:1 to 3:1, 1:1 to 2:1, or 1:1 to 1.5:1.

The N/P ratio may be calculated using the following equation.

$$\frac{N}{P}\text{ratio} = \frac{\text{area}\left(\frac{mAh}{cm^2}\right) \times \text{anode efficiency}(\%)}{\text{Cathode design capacity per unit area}\left(\frac{mAh}{cm^2}\right)} \quad \text{Equation (1)}$$

In the above equation, anode charge capacity per unit area=anode loading level per unit area (g/cm$^2$)×anode active material rate(%)×anode charge capacity per unit weight (mAh/g), anode efficiency=(anode discharge capacity/anode charge capacity)×100, cathode design capacity per unit area=design capacity/ coated cathode area, and design capacity=anode loading level (g/cm$^2$)×cathode active material rate(%)×cathode charge capacity per unit weight (mAh/g)−irreversible anode capacity (mAh).

Cathode charge capacity per unit weight, anode charge capacity per unit weight, anode discharge capacity, and irreversible anode capacity may be measured using the following methods.

1) A method of measuring cathode charge capacity per unit weight: A half cell is prepared as a cathode to be evaluated, an opposite electrode is formed of lithium metal, capacity of the half cell is measured when charging is performed at low rate control (after 0.2 C), and the measured capacity is normalized by weight of the half cell.

2) A method of measuring anode charge capacity per unit weight: A half cell is prepared as an anode to be evaluated, an opposite electrode is formed of lithium metal, capacity of the half cell is measured when charging is performed at low rate control (after 0.2 C), and the measured capacity is normalized by weight of the half cell.

3) A method of measuring anode discharge capacity per unit weight: A half cell is prepared as an anode to be evaluated, an opposite electrode is formed of lithium metal, capacity of the half cell is measured at the time of discharging after charging is performed at low rate control (after 0.2 C), and the measured capacity is normalized by weight of the half cell.

4) A method of measuring irreversible anode capacity per unit weight: The difference between capacities at the time of charging and discharging an anode half cell once is measured.

5) Definition of anode loading level per unit area: Weight of an anode active material coated on an anode current collector per unit area.

6) Definition of cathode loading level per unit area: Weight of a cathode active material coated on a cathode current collector per unit area.

In a concrete example configured such that the N/P ratio at the interface between the unit cells is higher than the N/P ratio of the cathode and the anode constituting the unit cell having relatively large area, a loading level of a cathode constituting an n-th unit cell may be equal to a loading level of a cathode constituting an (n+1)-th unit cell and a loading level of an anode constituting the (n+1)-th unit cell may be higher than a loading level of an anode constituting the n-th unit cell.

In addition, the loading level of the anode constituting the (n+1)-th unit cell may be equal to the loading level of the anode constituting the n-th unit cell and the loading level of the cathode constituting an n-th unit cell may be higher than the loading level of the cathode constituting the (n+1)-th unit cell.

In this case, a ratio of the N/P ratio of the cathode and the anode constituting the n-th unit cell to the N/P ratio of the cathode and the anode constituting the (n+1)-th unit cell stacked on the n-th unit cell may be 1:1.

In this case, the N/P ratio of the cathode and the anode constituting the (n+1)-th unit cell stacked on the n-th unit cell may be higher than the N/P ratio of the cathode and the anode constituting the n-th unit cell.

At this time, the size or area of the electrodes constituting the n-th unit cell may be larger than the size or area of the electrodes constituting the (n+1)-th unit cell.

In another concrete example configured such that the N/P ratio at the interface between the unit cells is higher than the N/P ratio of the cathode and the anode constituting the unit cell having relatively large area, a loading level of a cathode constituting an (n−1)-th unit cell, a loading level of a cathode constituting an n-th unit cell, and a loading level of a cathode constituting an (n+1)-th unit cell may be equal and a loading level of an anode constituting the (n−1)-th unit cell and a loading level of an anode constituting the (n+1)-th unit cell may be higher than a loading level of an anode constituting the n-th unit cell.

In addition, the loading level of the anode constituting the (n−1)-th unit cell, the loading level of the anode constituting the n-th unit cell, and the loading level of the anode constituting the (n+1)-th unit cell may be equal and the loading level of the cathode constituting the n-th unit cell may be higher than the loading level of the cathode constituting the (n−1)-th unit cell and the loading level of the cathode constituting the (n+1)-th unit cell.

In this case, a ratio of the N/P ratio of the cathode and the anode constituting the n-th unit cell to the N/P ratio of the cathode and the anode constituting the (n+1)-th unit cell stacked on the n-th unit cell may be 1:1 and a ratio of the N/P ratio of the cathode and the anode constituting the n-th unit cell to the N/P ratio of the cathode and the anode constituting the (n−1)-th unit cell stacked on the n-th unit cell in the direction opposite to the height direction on the basis of a plane may be 1:1.

In this case, the N/P ratio of the cathode and the anode constituting the (n+1)-th unit cell stacked on the n-th unit cell may be higher than the N/P ratio of the cathode and the anode constituting the n-th unit cell and the N/P ratio of the cathode and the anode constituting the (n−1)-th unit cell stacked on the n-th unit cell in the direction opposite to the height direction on the basis of the plane may be higher than the N/P ratio of the cathode and the anode constituting the n-th unit cell.

At this time, the size or area of the electrodes constituting the n-th unit cell may be larger than the size or area of the electrodes constituting the (n−1)-th unit cell and the size or area of the electrodes constituting the (n+1)-th unit cell.

As long as the N/P ratio at the interface between the unit cells is equal to or higher than the N/P ratio of the cathode and the anode constituting the unit cell having relatively large area, the N/P ratio of the cathode and the anode constituting the unit cell having relatively small area may be equal to or higher than the N/P ratio of the cathode and the anode constituting the unit cell having relatively large area.

In addition, as long as the N/P ratio at the interface between the unit cells is equal to or higher than the N/P ratio of the cathode and the anode constituting the unit cell having relatively large area, the loading level of the anode constituting the unit cell having relatively small area may be equal to or higher than the loading level of the anode constituting the unit cell having relatively large area.

Furthermore, as long as the N/P ratio at the interface between the unit cells is equal to or higher than the N/P ratio of the cathode and the anode constituting the unit cell having relatively large area, the loading level of the cathode constituting the unit cell having relatively small area may be equal to or lower than the loading level of the cathode constituting the unit cell having relatively large area.

Under the condition that the electrodes have the same porosity, the loading levels of the electrodes may be checked based on the thicknesses of the electrodes. The thicknesses of the electrodes may be checked using ion milling.

The unit cells may be an even number of, e.g. four or more, unit cells. The unit cells may be stacked in the direction in which the electrode plates are stacked to form two or more electrode groups, the uppermost and lowermost electrode plates of which have opposite polarities. The unit cells may be stacked in the height direction on the basis of a plane such that the electrode plates having opposite polarities face each other in a state in which the separation film is disposed between the electrode plates.

The surface of each of the electrode groups from which the electrode tabs protrude may be referred to as the front of each of the electrode groups and the surface opposite to the front of each of the electrode groups may be referred to as the rear of each of the electrode groups. In addition, surfaces of each of the electrode groups parallel to the plane may be referred to as one major surface and the other major surface of each of the electrode groups. Furthermore, the surface of each of the electrode groups perpendicular to one major surface and the other major surface and parallel to the height direction may be one side surface of each of the electrode groups and the surface opposite to one side surface of each of the electrode groups may be the opposite side surface. One side surface and/or the other side surface may be referred to as sides.

The electrode groups may have different sizes. A stair-like structure may be formed from the stack structure of the electrode groups having different sizes.

At the interface between the stacked electrode groups, the cathode and the anode facing each other may have different areas.

For example, the electrode constituting the uppermost surface of a lower one of the stacked electrode groups and the electrode constituting the lowermost surface of an upper one of the stacked electrode groups may have different sizes or areas.

A ratio of capacity to area of the cathode and the anode at the interface between the stacked electrode groups (N/P ratio) may be equal to or greater than a ratio of capacity to area of the cathode and the anode constituting the unit cell having relatively large area (N/P ratio).

In a case in which the N/P ratio at the interface between the stacked electrode groups is lower than the N/P ratio of the cathode and the anode constituting the electrode group having relatively large area, the performance of a lithium secondary battery having the electrode group stack according to the present invention mounted therein may be deteriorated, which is not preferable.

A ratio of the N/P ratio of the cathode and the anode facing at the interface between the electrode groups to the N/P ratio of the cathode and the anode constituting each of the electrode groups may be 1:1 to 3:1, 1:1 to 2:1, or 1:1 to 1.5:1.

The N/P ratio may be calculated using equation (1) above.

In a concrete example configured such that the N/P ratio at the interface between the electrode groups is higher than the N/P ratio of the cathode and the anode constituting the electrode group having relatively large area, a loading level of a cathode constituting an n-th electrode group may be equal to a loading level of a cathode constituting an (n+1)-th electrode group and a loading level of an anode constituting the (n+1)-th electrode group may be higher than a loading level of an anode constituting the n-th electrode group.

In addition, the loading level of the anode constituting the (n+1)-th electrode group may be equal to the loading level of the anode constituting the n-th electrode group and the loading level of the cathode constituting an n-th electrode group may be higher than the loading level of the cathode constituting the (n+1)-th electrode group.

In this case, a ratio of the N/P ratio of the cathode and the anode constituting the n-th electrode group to the N/P ratio of the cathode and the anode constituting the (n+1)-th electrode group stacked on the n-th electrode group may be 1:1.

In this case, the N/P ratio of the cathode and the anode constituting the (n+1)-th electrode group stacked on the n-th electrode group may be higher than the N/P ratio of the cathode and the anode constituting the n-th electrode group.

At this time, the size or area of the electrodes constituting the n-th electrode group may be larger than the size or area of the electrodes constituting the (n+1)-th electrode group.

In another concrete example configured such that the N/P ratio at the interface between the electrode groups is higher than the N/P ratio of the cathode and the anode constituting the electrode group having relatively large area, a loading level of a cathode constituting an (n−1)-th electrode group, a loading level of a cathode constituting an n-th electrode group, and a loading level of a cathode constituting an (n+1)-th electrode group may be equal and a loading level of an anode constituting the (n−1)-th electrode group and a loading level of an anode constituting the (n+1)-th electrode group may be higher than a loading level of an anode constituting the n-th electrode group.

In addition, the loading level of the anode constituting the (n−1)-th electrode group, the loading level of the anode constituting the n-th electrode group, and the loading level of the anode constituting the (n+1)-th electrode group may be equal and the loading level of the cathode constituting the n-th electrode group may be higher than the loading level of the cathode constituting the (n−1)-th electrode group and the loading level of the cathode constituting the (n+1)-th electrode group.

In this case, a ratio of the N/P ratio of the cathode and the anode constituting the n-th electrode group to the N/P ratio of the cathode and the anode constituting the (n+1)-th electrode group stacked on the n-th electrode group may be 1:1 and a ratio of the N/P ratio of the cathode and the anode constituting the n-th electrode group to the N/P ratio of the cathode and the anode constituting the (n−1)-th electrode group stacked on the n-th electrode group in the direction opposite to the height direction on the basis of a plane may be 1:1.

In this case, the N/P ratio of the cathode and the anode constituting the (n+1)-th electrode group stacked on the n-th electrode group may be higher than the N/P ratio of the cathode and the anode constituting the n-th electrode group and the N/P ratio of the cathode and the anode constituting the (n−1)-th electrode group stacked on the n-th electrode group in the direction opposite to the height direction on the basis of the plane may be higher than the N/P ratio of the cathode and the anode constituting the n-th electrode group.

At this time, the size or area of the electrodes constituting the n-th electrode group may be larger than the size or area of the electrodes constituting the (n−1)-th electrode group and the size or area of the electrodes constituting the (n+1)-th electrode group.

As long as the N/P ratio at the interface between the electrode groups is equal to or higher than the N/P ratio of the cathode and the anode constituting the electrode group having relatively large area, the N/P ratio of the cathode and the anode constituting the electrode group having relatively small area may be equal to or higher than the N/P ratio of the cathode and the anode constituting the electrode group having relatively large area.

In addition, as long as the N/P ratio at the interface between the electrode groups is equal to or higher than the N/P ratio of the cathode and the anode constituting the electrode group having relatively large area, the loading level of the anode constituting the electrode group having relatively small area may be equal to or higher than the loading level of the anode constituting the electrode group having relatively large area.

Furthermore, as long as the N/P ratio at the interface between the electrode groups is equal to or higher than the N/P ratio of the cathode and the anode constituting the electrode group having relatively large area, the loading level of the cathode constituting the electrode group having relatively small area may be equal to or lower than the loading level of the cathode constituting the electrode group having relatively large area.

Under the condition that the electrodes have the same porosity, the loading levels of the electrodes may be checked based on the thicknesses of the electrodes. The thicknesses of the electrodes may be checked using ion milling.

In the structure in which the unit cells are stacked or in the structure in which the electrode groups are stacked, the electrode tabs of the electrode plates having the same polarity may protrude from the respective electrode plates such that the electrode tabs are arranged at a position at which the electrode tabs have the same virtual perpendicular line.

That is, on the basis of the position at which the electrode tabs of the smallest one of the electrode plates having the same polarity are formed, the other electrode tabs may be formed at positions at which the other electrode tabs have the same virtual perpendicular line as the electrode tabs of the smallest one of the electrode plates.

For example, the respective cathode tabs may be formed at positions at which the cathode tabs have the same virtual perpendicular line as the cathode tab of the smallest cathode plate on the basis of the position at which the cathode tab of the smallest cathode plate is formed.

In the above description, the plane means any plane. That is, the plane may be the ground or a plane perpendicular to the ground. Consequently, the electrode plates may be stacked on the ground in the height direction. Alternatively, the electrode plates may be stacked on the plane perpendicular to the ground in the height direction.

Hereinafter, the plane may be referred to as the ground for ease of understanding. In this case, the height direction from the plane may be referred to as the opposite direction of gravity and the direction opposite to the height direction may be referred to as the direction of gravity.

For example, the expression "the electrode plates are stacked in the height direction on the basis of the plane" in the above description may mean that the electrode plates may be stacked from the ground in the direction of gravity and/or in the opposite direction of gravity. Consequently, the stacked direction of the electrode plates may be the direction of gravity and/or the opposite direction of gravity.

Specifically, the stair-like structure may be formed in a case in which two electrode groups having different sizes are stacked while a separation film is disposed between the electrode groups such that one side surface and/or the other side surface of each of the electrode groups is covered by the separation film.

In addition, the stair-like structure may also be formed in a case in which three electrode groups having different sizes are stacked such that electrode plates having opposite polarities face each other while a separation film is disposed between the electrode groups and such that one side surface and/or the other side surface of each of the electrode groups is covered by the separation film.

Those skilled in the art may easily understand a stair-like structure having three or more steps from the above description, and therefore, a further detailed description thereof will be omitted.

A region at which the stair-like structure is formed is not particularly restricted.

Specifically, in a case in which the electrode groups are stacked such that only the fronts of the electrode groups are arranged on the same plane, the stair-like structure may be formed at the rears, one side surfaces, or the other side surfaces of the electrode groups. On the other hand, in a case in which the electrode groups are stacked such that the fronts, the rears, and the sides of the electrode groups are not arranged on the same plane, the stair-like structure may be formed at the fronts, the rears, and the sides of the electrode groups. In a concrete example, the stair-like structure may be formed at an electrode tab non-formation region, such as the rears and the sides of the electrode groups.

Those skilled in the art may easily understand a region at which the stair-like structure is formed from the above description, and therefore, a further detailed description thereof will be omitted.

The stair-like structure has a width and a height. The width of the stair-like structure may correspond to the difference between the overall widths or the overall lengths of the stacked electrode groups and the height of the stair-like structure may be the sum of the heights of steps. The height of each step may correspond to the height of each of the stacked electrode groups.

The width and/or step height of the stair-like structure may be changed based on the curvature of a device in which a battery cell having the electrode assembly is mounted.

The stair-like structure may have (i) the same step height and different widths or (ii) different widths and step heights.

In the structure in which the electrode groups having different sizes are stacked, a relatively large-sized one of the electrode plates disposed adjacent to each other in a state in which the separation film is disposed between the electrode plates may be an anode plate. In addition, a relatively large-sized one of the electrode plates disposed adjacent to each other in a state in which the separation film is disposed between the electrode plates may be a cathode plate. Alternatively, a relatively large-sized one of the electrode plates may be a cathode plate or an anode plate.

In a case in which a relatively large-sized one of the electrode plates disposed adjacent to each other in a state in which the separation film is disposed between the electrode plates is an anode plate, the anode plate may function as a safety member when an object, such as a nail, presses or penetrates the battery. Consequently, a primary minute short circuit of the battery may be caused, thereby preventing combustion and explosion of the battery.

The function of the anode plate as the safety member is very important in a battery module or a battery pack in which combustion and explosion of a battery constituting the battery module or the battery pack may lead to combustion and explosion of the battery module or the battery pack.

In addition, in a case in which a relatively large-sized one of the electrode plates disposed adjacent to each other in a state in which the separation film is disposed between the electrode plates is an anode plate, it is possible to minimize dendritic growth during charge and discharge of the battery as compared with in a case in which a relatively large-sized one of the electrode plates disposed adjacent to each other in a state in which the separation film is disposed between the electrode plates is a cathode plate.

For example, in a case in which a relatively large-sized one of the electrode plates disposed adjacent to each other in a state in which the separation film is disposed between the electrode plates is an anode plate, the lowermost electrode plate of the lowermost one of the stacked unit cells may be a cathode plate. In this case, cathode slurry may be applied to only one major surface of the lowermost cathode plate contacting the separator plate. Specifically, cathode slurry may be applied to only one major surface of the cathode plate at a region of the cathode plate facing one major surface or the other major surface of the anode plate adjacent to the cathode plate in a state in which the separator plate is disposed between the cathode plate and the anode plate.

As another example, in a case in which a relatively large-sized one of the electrode plates disposed adjacent to each other in a state in which the separation film is disposed between the electrode plates is a cathode plate, the lowermost electrode plate of the lowermost one of the stacked unit cells may be an anode plate.

In the electrode assembly according to the present invention, one or more unit cells may be stacked such that electrode plates having opposite polarities face each other in a state in which a separation film is disposed between the electrode plates in the direction opposite to the height direction symmetrically or asymmetrically to the battery cells stacked in the height direction on the basis of the plane.

That is, the electrode groups may be stacked in the height direction on the basis of the plane and the direction opposite to the height direction, i.e. in opposite directions. In this case, the electrode groups stacked in the height direction on the basis of the plane and the electrode groups stacked in the direction opposite to the height direction may be symmetrically or asymmetrically stacked.

Specifically, in a case in which the electrode groups are symmetrically stacked in the opposite directions, the electrode groups may be stacked such that only the fronts of the electrode groups are arranged on the same plane in the height direction and only the rears of the electrode groups are arranged on the same plane in the direction opposite to the height direction. In addition, one side surfaces and the other side surfaces of the stacked electrode groups may be arranged on the same plane in the height direction and in the direction opposite to the height direction. The stack arrangement of the unit cells as described above is merely a concrete example of the present invention, and therefore, the arrangement of the unit cells is not limited to the above example.

In a case in which the electrode groups are stacked such that only the fronts of the electrode groups are arranged on the same plane in the height direction and only the rears of the electrode groups are arranged on the same plane in the direction opposite to the height direction as described above, the electrode assembly according to the present invention may be configured such that the electrode groups are asymmetrically stacked in the height direction and in the direction opposite to the height direction.

In addition, the electrode groups may be stacked such that the fronts, the rears, one side surfaces, and the other side surfaces of the electrode groups are not arranged on the same plane in the opposite directions. In this case, the electrode assembly according to the present invention may be formed in the shape of a symmetric frustum of an octagonal pyramid. Of course, those skilled in the art may easily understand from the above description that the electrode groups may be stacked such that the electrode assembly may be formed in the shape of an asymmetric frustum of an octagonal pyramid.

The one-unit sheet type separation film may be located at one major surface and the other major surface of each of the unit cells to prevent the occurrence of a short circuit between a cathode of one unit cell and an anode of another unit cell facing the cathode of one unit cell. In addition, the sheet type separation film may cover one side surface and/or the other side surface of each of the unit cells to securely maintain interface contact between the electrode plates and the separator plates and between the unit cells and the separation film due to repetitive charge and discharge. Specifically, tensile force generated during winding of the separation film provides pressure to achieve tight interface contact between the electrode plates and the separator plates and between the unit cells and the separation film.

The separation film may have a sufficient length to cover one major surface and the other major surface and one side surface and/or the other side surface of each of the unit cells.

On the other hand, the length of the separation film may be longer than the above-defined length. In this case, the remaining portion of the separation film covering one major surface and the other major surface and one side surface and/or the other side surface of each of the unit cells may cover the outside of the unit cell stack and the ends of the separation film may be fixed by thermal welding or taping. For example, a heat welding machine or a heating plate may contact the ends of the separation film such that the separation film is melted by heat and then adhered and fixed. As a result, interface contact between the electrode plates and the separator plates and between the unit cells and the separation film is more securely maintained.

In a case in which the separation film covers one major surface and the other major surface and one side surface and/or the other side surface of each of the unit cells as described above, the separation film may be disposed in tight contact with one major surface and the other major surface of each of the unit cells.

On the other hand, in a case in which the separation film covers one major surface, the other major surface, and sides of each of the unit cells and then covers the outside of the unit cell stack, the separation film may not be disposed in tight contact with one side surface and/or the other side surface of each of the unit cells having different sizes.

In this case, therefore, the portion of the separation film spaced apart from one side surface and/or the other side surface of each of the unit cells may be cut or heated such that the separation film tightly contacts one side surface and/or the other side surface of each of the unit cells.

Meanwhile, even in a case in which the separation film covers one major surface and the other major surface and one side surface and/or the other side surface of each of the unit cells, the separation film may not be disposed in tight contact with one side surface and/or the other side surface of each of the unit cells having different sizes.

Even in this case, therefore, the portion of the separation film spaced apart from one side surface and/or the other side surface of each of the unit cells may be cut or heated such that the separation film tightly contacts one side surface and/or the other side surface of each of the unit cells.

In accordance with another aspect of the present invention, there is provided a lithium secondary battery wherein the electrode assembly is mounted in a battery case in a sealed state such that the electrode assembly is impregnated with an electrolyte. The lithium secondary battery has electrode terminals configured to have a structure in which electrode tabs of the electrode assembly are coupled to electrode leads.

At least one selected from among overall widths, overall lengths, and overall heights of the electrode leads may be different. Alternatively, the electrode leads may have the same overall width, overall length, and overall height.

The battery case is formed of a laminate sheet including a resin layer and a metal layer. The battery case may have a receiving part, in which the electrode assembly of the stair-like structure according to the present invention is mounted. The receiving part may have a stair-like structure corresponding to the shape of the electrode assembly of the stair-like structure.

The lithium secondary battery may be used as a power source for a mobile phone, a portable computer, a smartphone, a smart pad, a netbook computer, a light electric vehicle (LEV), an electric vehicle, a hybrid electric vehicle, a plug-in hybrid electric vehicle, and a power storage unit.

Effects of the Invention

As is apparent from the above description, the electrode assembly according to the present invention includes a stair-like structure changed based on the curvature of a device. Consequently, the present invention has an effect of increasing the capacity of the device per unit volume by utilizing a dead space defined in the device unlike a conventional electrode assembly.

In addition, the electrode assembly according to the present invention has an effect of providing higher energy density per unit thickness than an electrode assembly wherein 2n+1 (n being a natural number equal to or greater than 1) unit cells are stacked.

Furthermore, the electrode assembly according to the present invention has an effect of improving safety in the event of external impact or nail penetration.

DESCRIPTION OF DRAWINGS

The above and other objects, features and other advantages of the present invention will be more clearly understood from the following detailed description taken in conjunction with the accompanying drawings, in which.

DETAILED DESCRIPTION OF THE INVENTION

Now, preferred embodiments of the present invention will be described in detail with reference to the accompanying drawings. It should be noted, however, that the scope of the present invention is not limited by the illustrated embodiments.

Figure 1A:
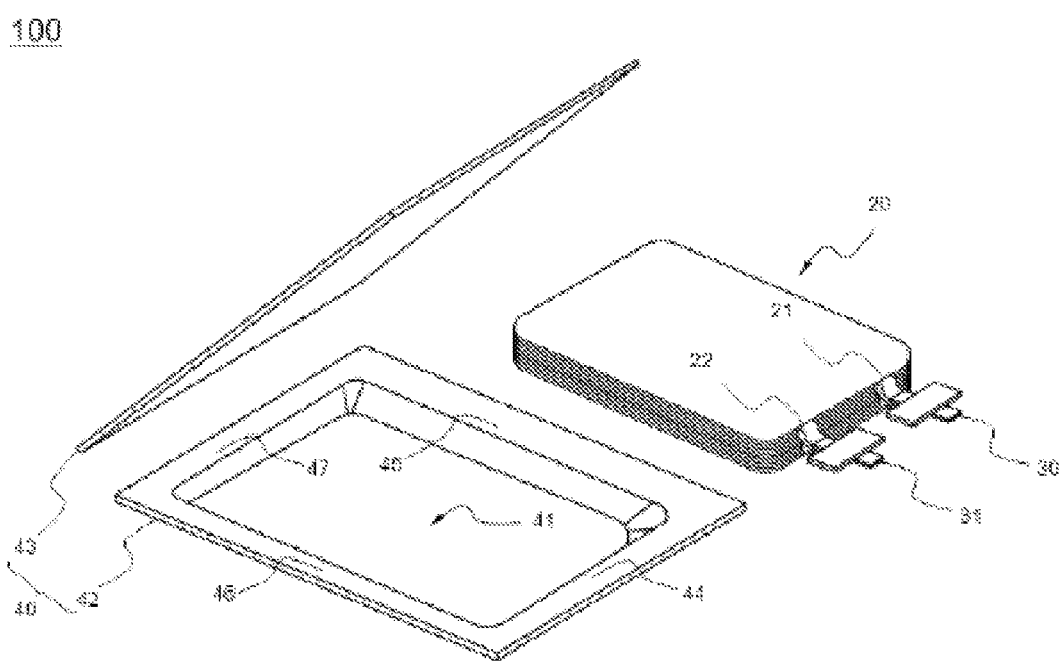
FIGS. 1A and 1B are exploded perspective views showing a conventional representative pouch-shaped secondary battery.
Figure 1B:
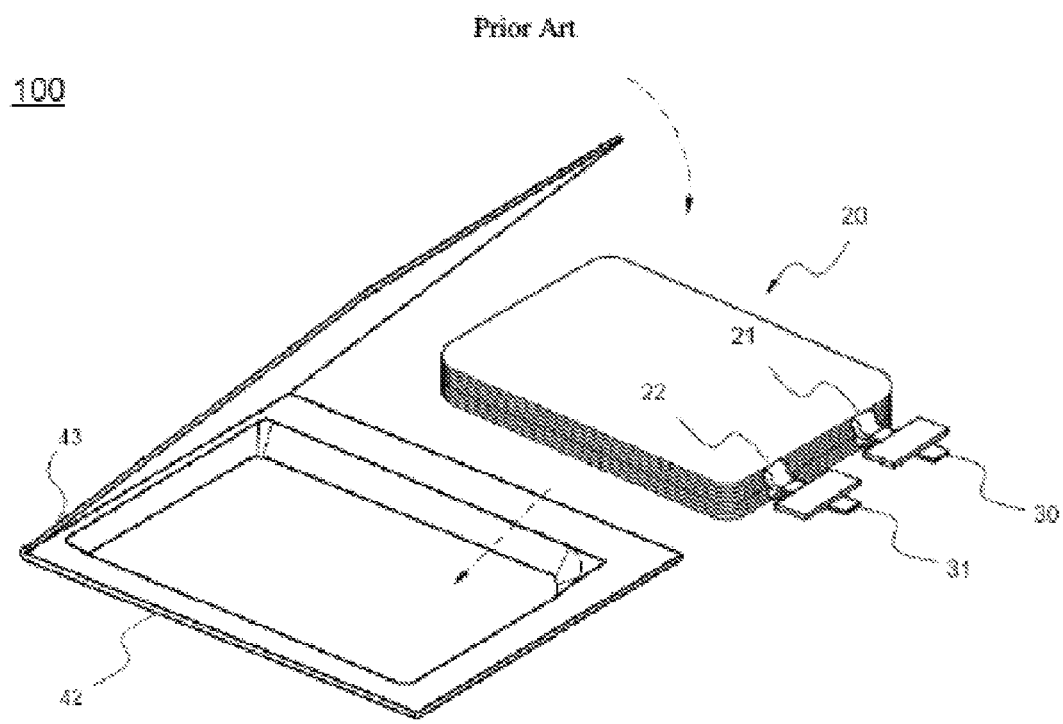
Figure 2:
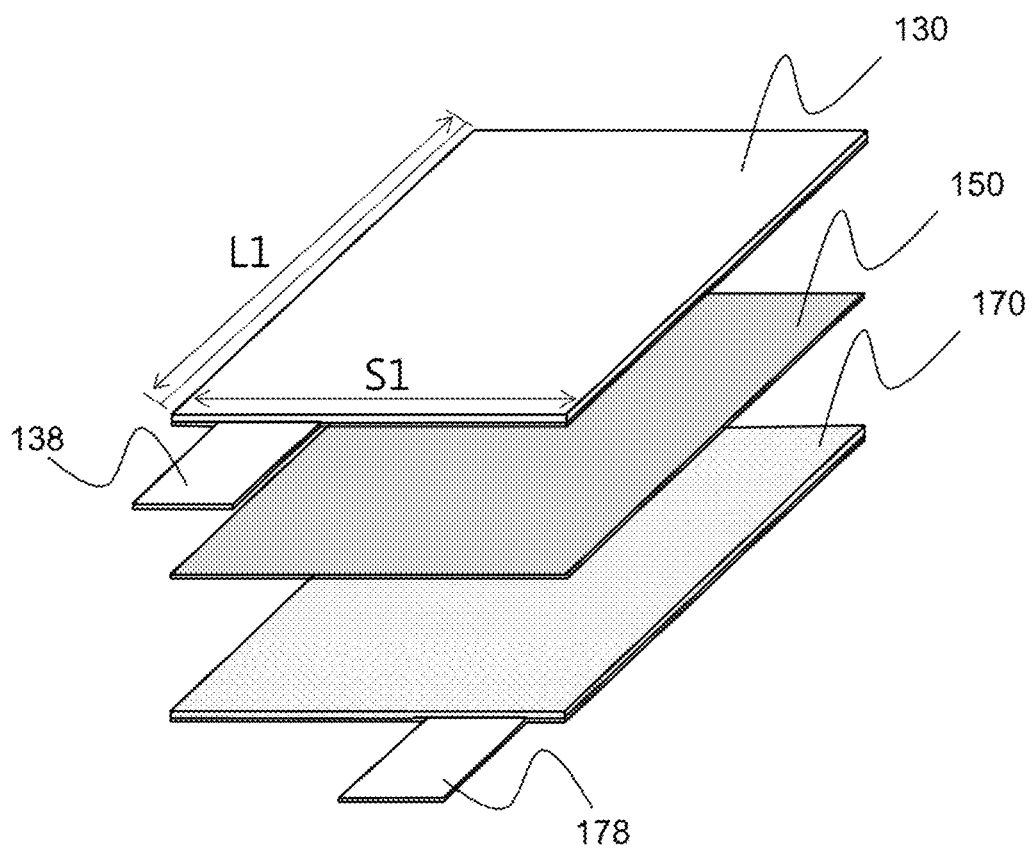
FIGS. 2 and 3 are a perspective view and a vertical sectional view typically showing electrode plates and a separator plate constituting an electrode assembly according to the present invention.
Figure 3:
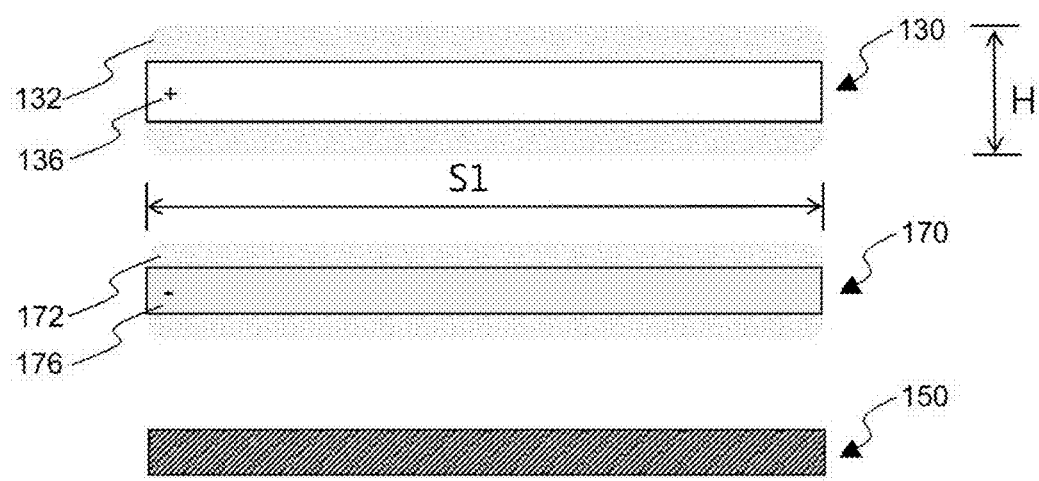

A cathode plate 130, an anode plate 170, and a separator plate 150 constituting an electrode assembly according to the present invention are typically shown in FIGS. 2 and 3. Referring to FIGS. 2 and 3, the cathode plate 130 is configured to have a structure in which cathode slurry 132 is applied to a cathode current collector 136 and the anode plate 170 is configured to have a structure in which anode slurry 172 is applied to an anode current collector 176.

In the cathode plate 130 of FIG. 2, the cathode slurry 132 is applied to the top and bottom of the cathode current collector 136. In the anode plate 170 of FIG. 2, the anode slurry 172 is applied to the top and bottom of the anode current collector 176. The cathode plate 130 and the anode plate 170 of FIGS. 2 and 3 are formed in the shape of a rectangular parallelepiped having an overall length L1, an overall width S1, and an overall height H.

Figure 4:
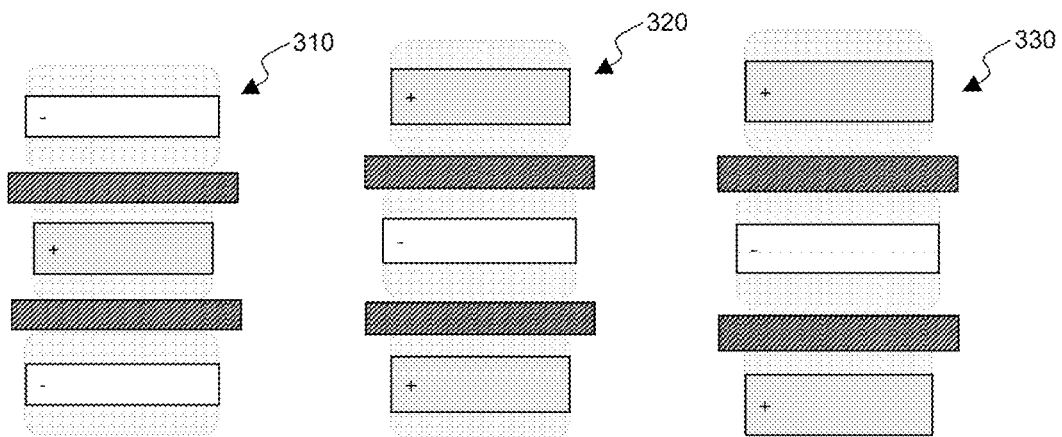
FIG. 4 is a vertical sectional view typically showing unit cells configured to have a structure in which the uppermost electrode plate and the lowermost electrode plate have the same polarity.

FIG. 4 is a vertical sectional view typically showing unit cells 400 configured to have a structure in which the cathode plate 130 and the anode plate 170 of FIG. 3 are alternately stacked in the height direction on the basis of a plane parallel to the stack plane in a state in which the separator plate 150 is disposed between the cathode plate 130 and the anode plate 170.

In unit cells 310, 320, and 330 of FIG. 4, the uppermost electrode plate and the lowermost electrode plate have the same polarity. Cathode slurry is applied to only one major surface of the lowermost cathode plate of the unit cell 330 directly contacting the separator plate stacked on the lowermost cathode plate.

Figure 5:
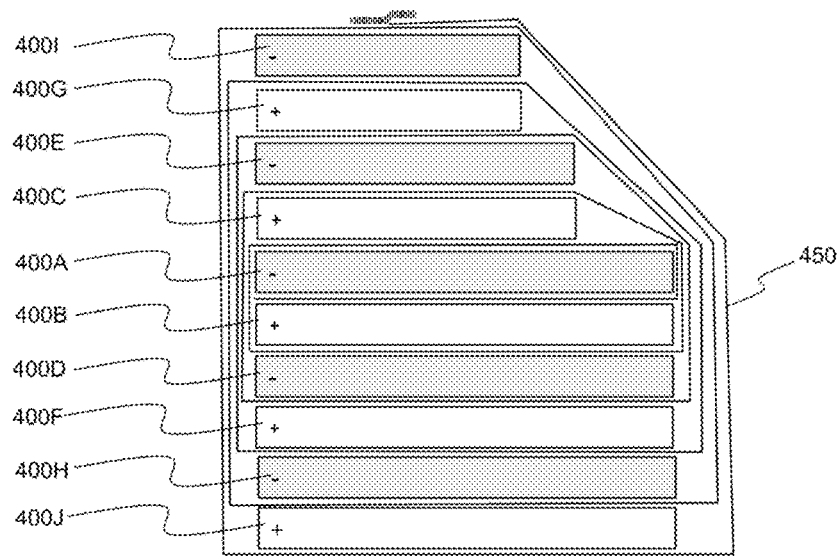
FIG. 5 is a vertical sectional view typically showing an electrode assembly according to an embodiment of the present invention having the unit cells having different overall widths of FIG. 4.

FIG. 5 is a vertical sectional view typically showing an electrode assembly according to the present invention including the unit cells of FIG. 4.

Specifically, unit cells 400J, 400H, 400F, 400D, 400B, and 400A having the same and largest overall width are sequentially stacked on the lowermost end of the electrode assembly in the height direction on the basis of a plane. Unit cells 400C and 400E having the same but smaller overall width than the unit cells 400J, 400H, 400F, 400D, 400B, and 400A are sequentially stacked on the upper end of the unit cell 400A. Unit cells 400G and 400I having the same but smaller overall width than the unit cells 400C and 400E are sequentially stacked on the upper end of the unit cell 400E. The lowermost unit cell 400J corresponds to the unit cell 330 of FIG. 4, the unit cells 400H, 400D, 400A, 400E, and 400I correspond to the unit cell 310 of FIG. 4, and the unit cells 400F, 400B, 400C, and 400G correspond to the unit cell 320 of FIG. 4.

The unit cells 400J, 400H, 400F, 400D, 400B, 400A, 400C, 400E, 400G, and 400I are stacked such that one side surfaces or the other side surfaces of the unit cells 400J, 400H, 400F, 400D, 400B, 400A, 400C, 400E, 400G, and 400I are aligned or on the same plane.

The unit cells 400J, 400H, 400F, 400D, 400B, and 400A constitute a first electrode group, the unit cells 400C and 400E constitute a second electrode group, and the unit cells 400G and 400I constitute a third electrode group. In each of the electrode groups, an even number of unit cells having the same size are stacked. The first electrode group, the second electrode group, and the third electrode group have different overall widths.

That is, a space corresponding to the difference in overall width between the first electrode group and the second electrode group is formed at a stack interface between the first electrode group and the second electrode group. In addition, a space corresponding to the difference in overall width between the second electrode group and the third electrode group is also formed at a stack interface between the second electrode group and the third electrode group. Consequently, the unit cells 400J, 400H, 400F, 400D, 400B, 400A, 400C, 400E, 400G, and 400I are stacked to form a stair-like structure having a width and a height. The width of the stair-like structure may be changed according to the difference in overall width among the first electrode group, the second electrode group, and the third electrode group. In the unit cells forming the width of the stair-like structure, the uppermost electrode plates and the lowermost electrode plates are anodes.

In the electrode assembly of FIG. 5, the unit cells having different overall widths of FIG. 4 are used. Therefore, those skilled in the art will appreciate from the above description that even in a case in which the unit cells have different overall lengths, the stair-like structure may have a width corresponding to the difference in overall lengths among the first electrode group, the second electrode group, and the third electrode group.

In addition, referring to FIG. 5, the unit cells 400J, 400H, 400F, 400D, 400B, 400A, 400C, 400E, 400G, and 400I have the same height. Consequently, the sum of the heights of the unit cells 400J, 400H, 400F, 400D, 400B, and 400A is greater than the sum of the heights of the unit cells 400C and 400E. As a result, the electrode assembly of FIG. 5 includes a stair-like structure having a height difference. As previously described, the width and the height of the stair-like structure may be changed based on the curvature of a curved device.

One major surface, the other major surface, one side surface, and the other side surface of each of the unit cells 400J, 400H, 400F, 400D, 400B, 400A, 400C, 400E, 400G, and 400I are covered by a separation film 450. The outside of a stack constituted by the unit cells 400J, 400H, 400F, 400D, 400B, 400A, 400C, 400E, 400G, and 400I is also covered by the separation film 450.

After the outside of the stack constituted by the unit cells 400J, 400H, 400F, 400D, 400B, 400A, 400C, 400E, 400G, and 400I is covered by the separation film 450, the separation film 450 may be fixed by thermal welding or taping. In FIG. 5, the separation film 450 is fixed by taping after the outside of the stack constituted by the unit cells 400J, 400H, 400F, 400D, 400B, 400A, 400C, 400E, 400G, and 400I is covered by the separation film 450.

Figure 6:
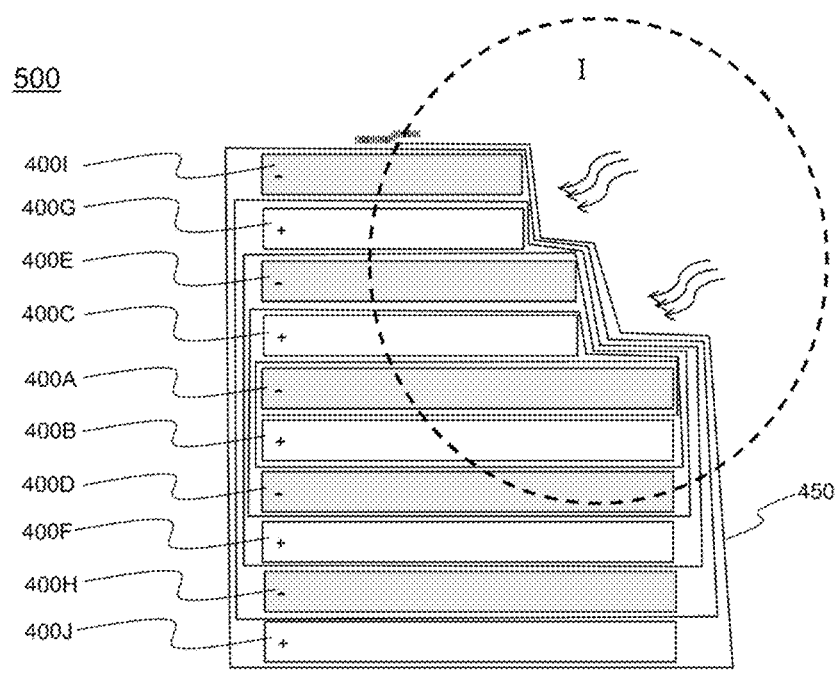
FIGS. 6 and 7 are vertical sectional views typically showing an electrode assembly according to another embodiment of the present invention having the unit cells having different overall widths of FIG. 5.

In an electrode assembly of FIG. 6, a separation film 450 is heated such that the separation film 450 tightly contacts one side surfaces or the other side surfaces of unit cells 400J, 400H, 400F, 400D, 400B, 400A, 400C, 400E, 400G, and 400I at which a stair-like structure is formed, which is different from the electrode assembly of FIG. 5 (see a dotted-line circle I).

Figure 7:
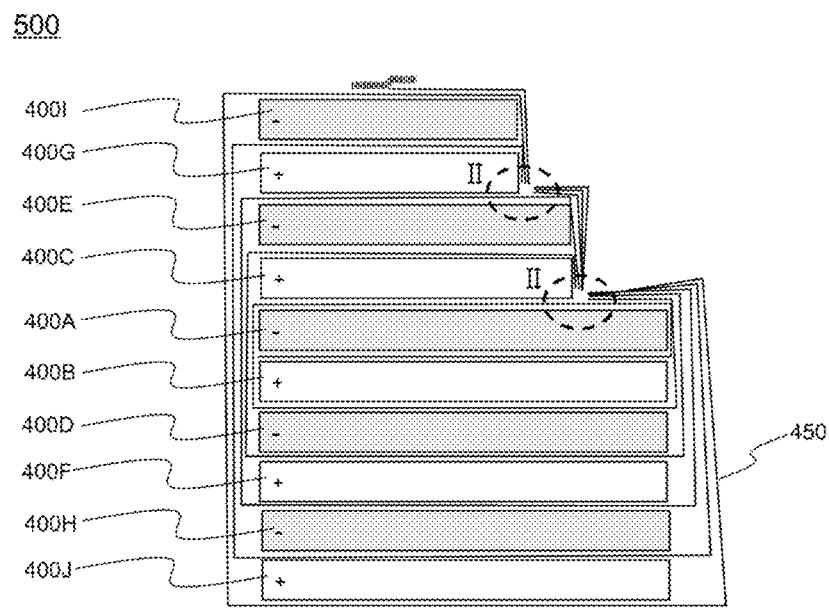

Referring to FIG. 7, the separation film 450 tightly contacts one side surfaces or the other side surfaces of the unit cells 400J, 400H, 400F, 400D, 400B, 400A, 400C, 400E, 400G, and 400I at which the stair-like structure is formed. Specifically, the separation film 450 is cut such that the separation film 450 tightly contacts one side surfaces or the other side surfaces of the unit cells 400J, 400H, 400F, 400D, 400B, 400A, 400C, 400E, 400G, and 400I at which the stair-like structure is formed (see dotted-line circles II).

Figure 8:
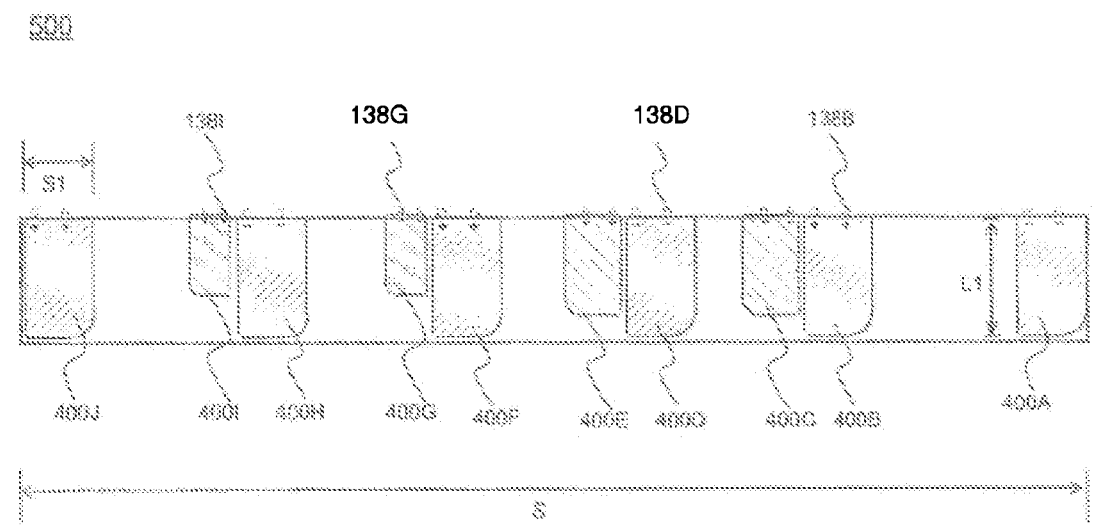
FIG. 8 is a development view typically showing an electrode assembly having the unit cells having different overall widths of FIGS. 5 7.

FIG. 8 is a development view typically showing an electrode assembly according to another embodiment of the present invention having the unit cells having different overall widths of FIGS. 5-7.

Figure 9:
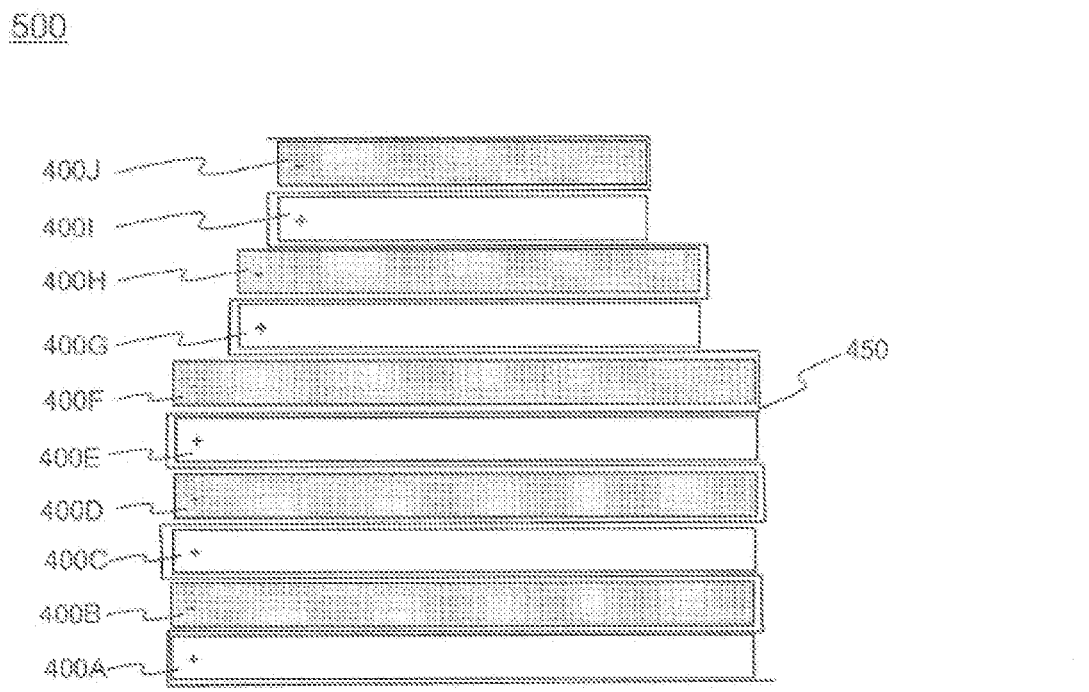
FIGS. 9 and 10 are vertical sectional views showing an electrode assembly according to another embodiment of the present invention.
Figure 10:
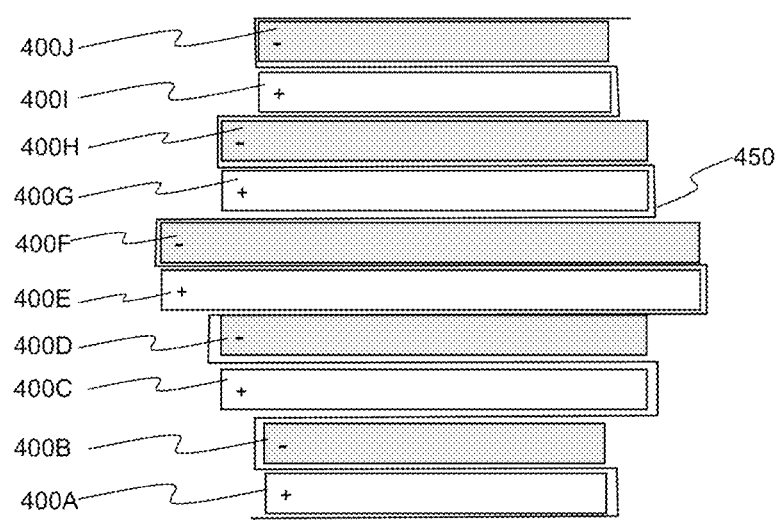

Specifically, the electrode assembly includes unit cells 400A, 400B, 400C, 400D, 400E, 400F, 400G, 400H, 400I, and 400J having different overall widths S1 and different overall lengths L1, which is different from the electrode assemblies of FIGS. 9 and 10 having different overall widths.

The unit cell 400A is spaced apart from the unit cell 400B by a distance corresponding to the sum of the overall width S1 of the unit cell 400A and the height of the unit cell 400B on a separation film 450 having a width equivalent to the unit cells 400A, 400B, 400D, 400F, 400H, and 400J having the largest overall length L1 in the length (S) direction of the separation film 450. In addition, the unit cell 400C is spaced apart from the unit cell 400B by a distance equivalent to the sum of the heights of the unit cells 400A and 400B and the thickness of the separation film 450 on the separation film 450 in the length (S) direction of the separation film 450. That is, the unit cells 400A, 400B, 400C, 400D, 400E, 400F, 400G, 400H, 400I, and 400J are sequentially arranged on the separation film 450 at predetermined intervals. The unit cell 400A is located at a folding start point and the unit cell 400J is located at a folding end point.

The unit cells 400J, 400H, 400F, 400D, 400B, and 400A constitute a first electrode group, the unit cells 400C and 400E constitute a second electrode group, and the unit cells 400G and 400I constitute a third electrode group.

In each of the electrode groups, an even number of unit cells having the same size are stacked. The first electrode group, the second electrode group, and the third electrode group have different overall widths and different overall lengths.

The separation film, on which the unit cells 400A, 400B, 400C, 400D, 400E, 400F, 400G, 400H, 400I, and 400J are arranged, may be folded to manufacture an electrode assembly including stacked unit cells having different overall widths and different overall lengths.

One corner of each of the unit cells 400A, 400B, 400C, 400D, 400E, 400F, 400G, 400H, 400I, and 400J of FIG. 8 is curved in plane. Of course, even in a case in which corners of each of the unit cells 400A, 400B, 400C, 400D, 400E, 400F, 400G, 400H, 400I, and 400J of FIG. 8 are right-angled in plane, the unit cells 400A, 400B, 400C, 400D, 400E, 400F, 400G, 400H, 400I, and 400J may be arranged as shown in FIG. 8 to manufacture an electrode assembly. In addition, those skilled in the art will appreciate from the above description that the unit cells 400A, 400B, 400C, 400D, 400E, 400F, 400G, 400H, 400I, and 400J of FIGS. 5 to 7 only having different overall widths may be arranged to manufacture the electrode assembly shown in FIGS. 5 to 7.

Referring to FIG. 8, the overall width of electrode tabs of the unit cells 400A, 400B, 400D, 400F, 400H, and 400J is larger than that of electrode tabs of the unit cells 400C and 400E. Similarly, the overall width of electrode tabs of the unit cells 400C and 400E is larger than that of electrode tabs of the unit cells 400G and 400I.

Specifically, cathode tabs 138B and 138I of the unit cells 400B and 400I have different overall widths. In addition, cathode tabs 138D and 138G of the unit cells 400D and 400G have different overall widths.

In FIG. 8, the separation film 450 has a sufficient length S to cover one major surface, the other major surface, one side surface, and the other side surface of each of the unit cells 400A, 400B, 400C, 400D, 400E, 400F, 400G, 400H, 400I, and 400J. However, those skilled in the art will appreciate that the separation film 450 has a sufficient length to cover the outside of the stack constituted by the unit cells 400A, 400B, 400C, 400D, 400E, 400F, 400G, 400H, 400I, and 400J.

In an electrode assembly of FIG. 9, a separation film 450 covers only one side surface or the other side surface of unit cells 400A, 400B, 400C, 400D, 400E, 400F, 400G, 400H, 400I, and 400J and one side surfaces and the other side surfaces of the unit cells 400A, 400B, 400C, 400D, 400E, 400F, 400G, 400H, 400I, and 400J are neither aligned nor on the same plane, which is different from the electrode assembly of FIG. 5.

In an electrode assembly of FIG. 10, unit cells 400A, 400B, 400C, 400D, 400E, 400F, 400G, 400H, 400I, and 400J are stacked such that the unit cells 400A, 400B, 400C, 400D, 400E, 400F, 400G, 400H, 400I, and 400J are symmetric with respect to the height direction or the direction opposite to the height direction, which is different from the electrode assembly of FIG. 9.

The unit cells 400I and 400J constitute a first electrode group, the unit cells 400H and 400G constitute a second electrode group, the unit cells 400F and 400E constitute a third electrode group, the unit cells 400D and 400C constitute a fourth electrode group, and the unit cells 400B and 400A constitute a fifth electrode group. Referring to FIG. 10, among electrode plates, having opposite polarities, disposed in a state in which a separation film 450 is disposed between the electrode plates, electrode plates having relatively long overall width may be anode plates or cathode plates.

Figure 12:
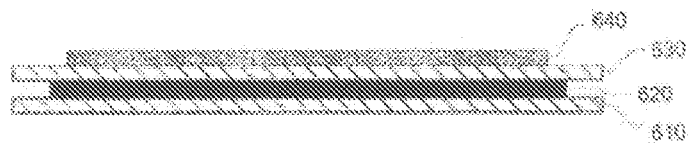
FIG. 12 is a sectional view typically showing the structure of a first electrode plate stack according to an unlimited embodiment of the present invention.
Figure 13:
FIG. 13 is a sectional view typically showing the structure of a second electrode plate stack according to an unlimited embodiment of the present invention.

FIG. 12 is a sectional view typically showing a first electrode plate stack and FIG. 13 is a sectional view typically showing a second electrode plate stack.

As shown in FIG. 12, the first electrode plate stack is configured to have a structure in which a separator plate 310, a cathode plate 320, a separator plate 330, and an anode plate 340 are laminated while being sequentially stacked.

As shown in FIG. 13, the second electrode plate stack is configured to have a structure in which a separator plate 710, an anode plate 720, and a separator plate 730 are laminated while being sequentially stacked.

Figure 14:
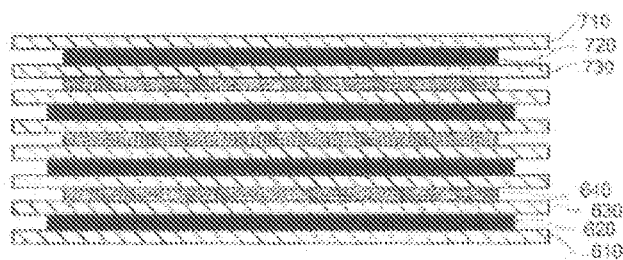
FIG. 14 is a sectional view typically showing the structure of a stacked type unit cell including the first electrode plate stack of FIG. 12 and the second electrode plate stack of FIG. 13.

FIG. 14 shows a stacked type electrode group configured to have a structure in which the second electrode plate stack of FIG. 13 is stacked on the uppermost end of the first electrode plate stack of FIG. 12.

Figure 15:
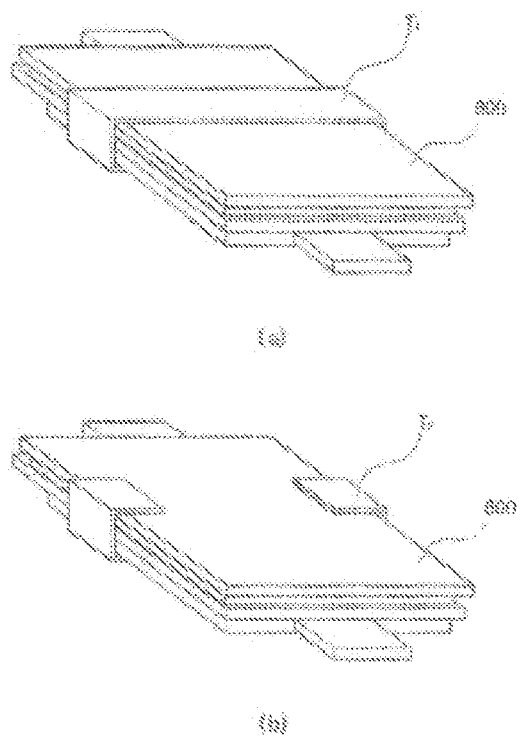
FIG. 15 is a typical view showing a fixing structure of the first electrode plate stack of FIG. 12.

FIG. 15 shows an embodiment in which a fixing member T1 is added to the first electrode plate stack of FIG. 12.

Specifically, the fixing member T1 is added to the side or the front of the first electrode plate stack 600.

In order to secure stack stability of a simple stack structure, an additional fixing member may be added to the side of the stack structure to fix the stack structure. The fixing member may be realized as a tape T1 surrounding the entire surface of the first electrode plate stack 600 as shown in FIG. 15(a). Alternatively, the fixing member 10 may be realized as a fixing member T2 to fix only each side of the electrode plate stack 600 as shown in FIG. 15(b).

Figure 16:
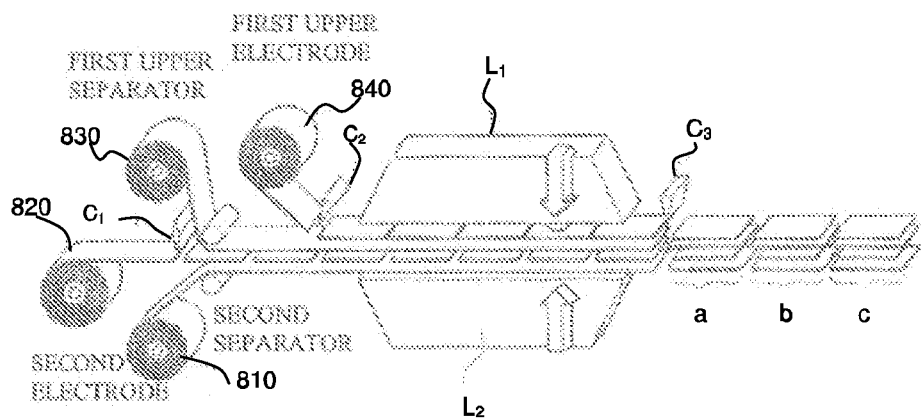
FIG. 16 is a view typically showing a process of manufacturing a first electrode plate stack according to an unlimited embodiment of the present invention.

FIG. 16 is a view typically showing a process of manufacturing the first electrode plate stack according to the present invention.

As shown in FIG. 16, materials for a separator plate 810, a cathode plate 820, a separator plate 830, and an anode plate 840 are simultaneously loaded (using sheet type loading units). The material for the cathode plate 820, which is used as a middle layer, is cut into a designed size and is then loaded into laminators L1 and L2. Subsequently, the materials for the separator plates 810 and 830, which are disposed under and above the material for the cathode plate 820, are simultaneously loaded into the laminators $L_1$ and $L_2$. At the same time, the material for the anode plate 840 is loaded into the laminators $L_1$ and $L_2$.

Subsequently, the laminators $L_1$ and $L_2$ form a structural body in which the two electrode plates and the two separator plates are laminated to each other using heat and pressure, i.e. a first electrode plate stack. Subsequently, a cutter $C_3$ cuts the structural body into a plurality of first electrode plate stacks. Afterwards, various inspection processes, such as a thickness inspection (a), a vision inspection (b), and a short circuit inspection (c), may be performed with respect to each first electrode plate stack.

Subsequently, each first electrode plate stack manufactured as described above is fixed using a fixing member, and the first electrode plate stacks are stacked to constitute a structural body in which the first electrode plate stacks are stacked. Subsequently, the second electrode plate stack shown in FIG. 13 is stacked on the structural body and then the second electrode plate stack and the structural body are fixed using a fixing member, thereby completing a stacked type electrode group.

Figure 17:
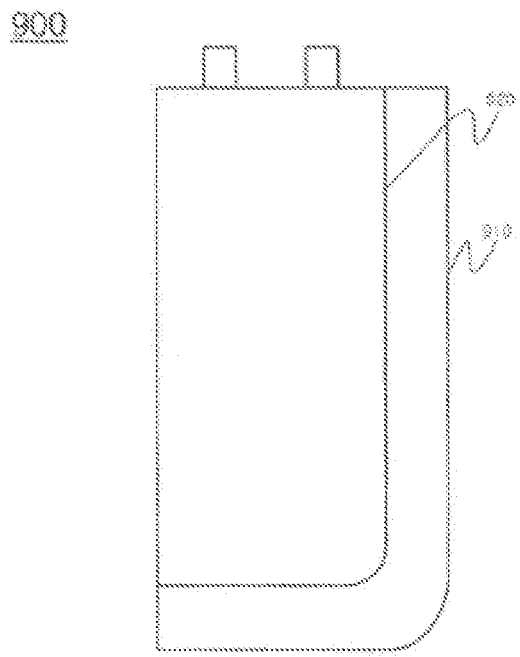
FIG. 17 is a plan view showing an electrode assembly according to a further embodiment of the present invention.

FIG. 17 is a plan view showing an electrode assembly according to a further embodiment of the present invention.

Referring to FIG. 17, two electrode plate stacks 910 and 920 having different sizes are stacked to form an electrode assembly 900 having a stair-like structure. The electrode assembly 900 may have a stair-like structure including one or more steps, each having a width and a height, based on the size or number of the electrode plate stacks.

EXPERIMENTAL EXAMPLE 1

Energy density of an electrode assembly including an even number of unit cells (for example, eight unit cells) according to an embodiment of the present invention and energy density of a conventional electrode assembly including an odd number of unit cells (for example, nine unit cells) were measured. The measurement results are shown in FIG. 11.

Figure 11:
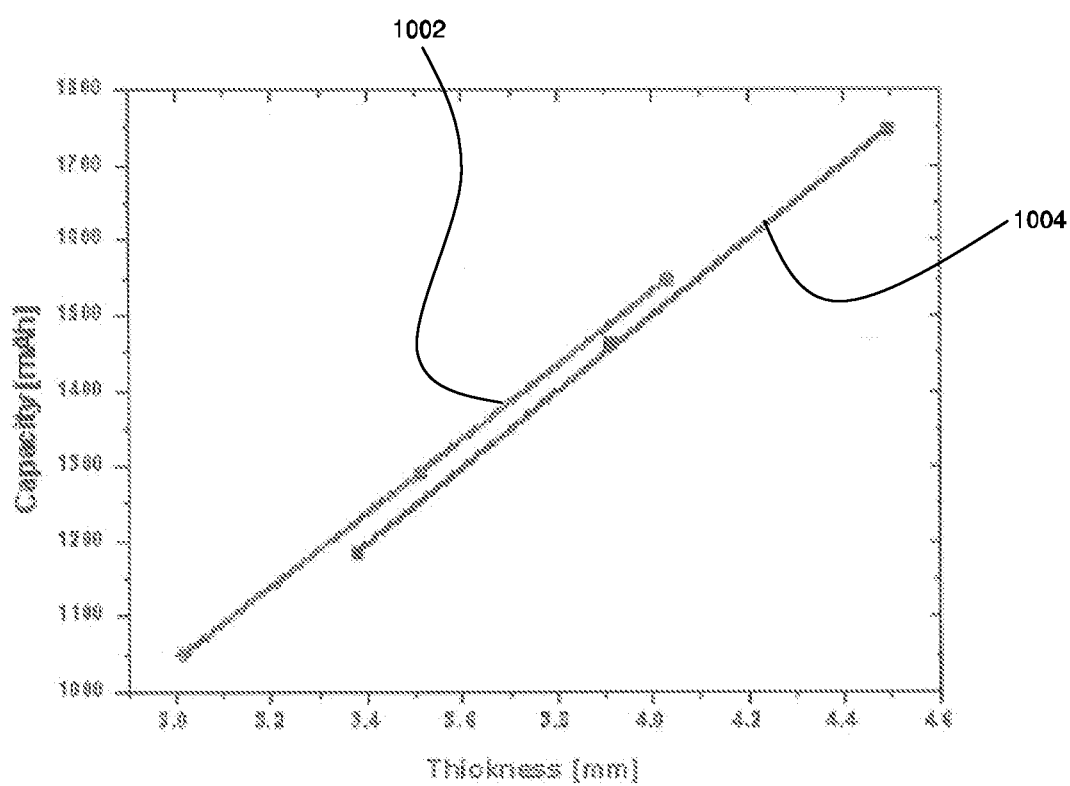
FIG. 11 is a graph showing comparison of capacity based on thickness between a conventional electrode assembly including 2n+1 S type unit cells and an electrode assembly according to an embodiment of the present invention.

Referring to FIG. 11, it can be seen that the electrode assembly including the even number of unit cells, which is represented by trend line 1002, according to the embodiment of the present invention has higher capacity than the conventional electrode assembly including the odd number of unit cells, which is represented by trend line 1004, when the thickness of the electrode assembly including the even number of unit cells according to the embodiment of the present invention is equal to that of the conventional electrode assembly including the odd number of unit cells.

Specifically, the electrode assembly including the even number of unit cells, each of which has a thickness of 3.9 mm, according to the embodiment of the present invention has a capacity of approximately 1500 mAh. On the other hand, the conventional electrode assembly including the odd number of unit cells, each of which has the same thickness of 3.9 mm, has a capacity of approximately 1450 mAh. Consequently, it can be seen that the electrode assembly including the even number of unit cells according to the embodiment of the present invention has about 3% higher capacity than the conventional electrode assembly including the odd number of unit cells when the thickness of the electrode assembly including the even number of unit cells according to the embodiment of the present invention is equal to that of the conventional electrode assembly including the odd number of unit cells.

It will be understood from the results shown in FIG. 11 that certain data points for each of the electrode assembly including the even number of unit cells and the conventional electrode assembly including the odd number of unit cells were plotted, and a trend line was fitted to the results for each electrode assembly.

According to the above-explanation, this provides the comparative results explained above even though electrode assemblies having unit cells of equal thicknesses were not necessarily tested. That is, trend line 1002 representing the electrode assembly including the even number of unit cells indicates that such electrode assembly according to the embodiment of the present invention has a higher capacity when the thickness of its unit cells is equal to the thickness of the unit cells of the conventional electrode assembly including the odd number of unit cells, represented by trend line 1004. In other words, given the electrode assembly including the even number of unit cells according to the embodiment of the present invention having a particular capacity, the conventional electrode assembly including the odd number of unit cells must include unit cells having a relatively greater thickness than those of the present invention in order to achieve that same particular capacity. As a result, an electrode assembly including the even number of unit cells according to the embodiment of the present invention can be made with a reduced thickness compared with an conventional electrode assembly, while still providing at least the same capacity.

EXPERIMENTAL EXAMPLE 2

Safety of an electrode assembly including eight unit cells according to an embodiment of the present invention and safety of a conventional electrode assembly including nine unit cells were tested. The test results are indicated in Table 1 below.

TABLE 1

| Item | Specification | Fail/Test |
| --- | --- | --- |
| Overcharge | No fire/No Explosion | 0/3 |
| Impact | No fire/No Explosion | 0/3 |
| Hot box | No fire/No Explosion | 0/3 |
| Side crush | No fire/No Explosion | 0/3 |

EXPERIMENTAL EXAMPLE 3

Nail penetration experiments were carried out with respect to an electrode assembly including eight unit cells according to an embodiment of the present invention and a conventional electrode assembly including nine unit cells. The experiment results are indicated in Table 2 below.

TABLE 2

| Nail direction | Single-sided cathode | Double-sided anode | | | |
|---|---|---|---|---|---|
| Voltage | 4.2 V | 4.2 V | 4.25 V | 4.3 V | 4.35 v |
| Present invention | 0/5 | 0/2 | 0/2 | 0/2 | 0/2 |
| Conventional art | 0/5 | 0/2 | 0/2 | 0/2 | 0/2 |

EXAMPLE

Cathode plates and anode plates were manufactured as indicated in Tables 3 to 5 below to manufacture an electrode group stack according to an embodiment of the present invention. The area of a cathode and an anode constituting a first step is larger than that of a cathode and an anode constituting a second stair. In addition, the area of the cathode and the anode constituting the second step is larger than that of a cathode and an anode constituting a third stair.

TABLE 3

Cathodes

| | Thickness mm | Porosity % | Loading level mg/cm² | Reversible capacity mAh |
|---|---|---|---|---|
| Cathode A | 100 | 21 | 16.8 | 335 |
| Cathode B | 110 | 21 | 18.8 | 375 |

TABLE 4

Anodes

| | Thickness mm | Porosity % | Loading level mg/cm2 | Reversible capacity mAh |
|---|---|---|---|---|
| Anode A | 105 | 27 | 7.76 | 348 |
| Anode B | 108 | 27 | 8 | 359 |
| Anode C | 110 | 27 | 8.24 | 369 |
| Anode D | 118.8 | 27 | 8.92 | 400 |
| Anode E | 90 | 27 | 6.56 | 294 |

EXPERIMENTAL EXAMPLE

Lithium secondary batteries having electrode group stacks according to Examples and Comparative examples mounted therein were repeatedly charged and discharged 500 times at a temperature of 25° C.

Electric capacities of the lithium secondary batteries after the lithium secondary batteries are charged and discharged 500 times are 60% or more those of the lithium secondary batteries after the lithium secondary batteries are charged and discharged once and that the rate of thickness change of electrode assemblies is 15% or less.

The electric capacities of the lithium secondary batteries were measured as follows.

In the minimum capacity of a battery, the amount of current flowing for one hour is defined as 1 C.

Charging was performed using a constant current and constant voltage (CC/CV) charging method. The battery was charged to a voltage of 4.2 V or 4.35 V at an amount of current of 1 C in a CC mode. Subsequently, the battery was charged in a CV mode until the amount of charged current becomes 1/20 of the minimum capacity of the battery and then charging was ended. Charging time was about 1 hour 30 minutes.

A pause time of 10 minutes was provided before discharging of the battery after charging of the battery. The battery was discharged in the CC mode at a current of 1 C. When the voltage of the battery reached 3.0 V, the discharging was ended. Discharging time was about 1 hour 10 minutes. A pause time of 10 minutes was provided before charging of the battery.

The rate of thickness change of the electrode group stacks may be calculated as follows: (Total thickness of the electrode group stacks after charging and discharging are carried out 500 times/total thickness of the electrode group stacks after charging and discharging are carried out once)×100.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

TABLE 5

| | | First step cathode | First step anode | Thickness ratio of first step anode to first step cathode | Second step cathode | Second step anode | Thickness ratio of second step anode to second step cathode | Third step cathode | Third step anode | Thickness ratio of second step anode to third step cathode | Thickness ratio of first step anode and cathode to second step anode and cathode | Thickness ratio of second step anode and cathode to third step anode and cathode |
|---|---|---|---|---|---|---|---|---|---|---|---|---|
| Examples | 1 | Cathode A | Anode A | 1.05 | Cathode A | Anode A | 1.05 | | | | 1.05 | |
| | 2 | Cathode A | Anode A | 1.05 | Cathode A | Anode B | 1.08 | | | | 1.05 | |
| | 3 | Cathode A | Anode A | 1.05 | Cathode A | Anode B | 1.08 | Cathode A | Anode C | 1.10 | 1.05 | 1.08 |
| | 4 | Cathode A | Anode A | 1.05 | Cathode A | Anode C | 1.10 | Cathode A | Anode B | 1.08 | 1.05 | 1.1 |
| Comparative examples | 1 | Cathode A | Anode B | 1.08 | Cathode B | Anode D | 1.08 | | | | 0.98 | |
| | 2 | Cathode A | Anode E | 0.90 | Cathode A | Anode A | 1.05 | | | | 1.08 | |

The invention claimed is:

1. A lithium secondary battery comprising:
an electrode assembly including:
an even number of unit cells, each of the unit cells having a structure in which electrode plates having opposite polarities are stacked in a height direction on the basis of a plane in a state in which a separator plate is disposed between the electrode plates, an uppermost electrode plate and a lowermost electrode plate have the same polarity, and electrode tabs protrude from the electrode plates, and
a single, monolithic sheet type separation film to cover one major surface, another major surface, and sides of each of the unit cells, which constitute an electrode tab non-formation region,
wherein the unit cells are stacked in the height direction on the basis of the plane such that the electrode plates having opposite polarities face each other in a state in which the separation film is disposed between the electrode plates,
wherein at least two of the stacked unit cells have different sizes, whereby the electrode assembly has a stair-like structure, and
wherein the separation film is disposed in contact with the major surface, the another major surface, and the sides of each of the unit cells,
wherein the electrode assembly is mounted in a battery case in a sealed state such that the electrode assembly is impregnated with an electrolyte.

2. The lithium secondary battery according to claim 1, wherein a larger of the electrode plates disposed adjacent to each other in a state in which the separation film is disposed between the electrode plates is an anode plate.

3. The lithium secondary battery according to claim 1, wherein a larger of the electrode plates disposed adjacent to each other in a state in which the separation film is disposed between the electrode plates is a cathode plate.

4. The lithium secondary battery according to claim 1, wherein a lowermost electrode plate of a lowermost one of the stacked unit cells is an anode plate.

5. The lithium secondary battery according to claim 1, wherein a lowermost electrode plate of a lowermost one of the stacked unit cells is a cathode plate.

6. The lithium secondary battery according to claim 5, wherein cathode slurry is present only on one major surface of the lowermost cathode plate contacting the separator plate.

7. The lithium secondary battery according to claim 6, wherein the cathode slurry is present only on a region of the one major surface of the cathode plate corresponding to one major surface of the anode plate stacked in a state in which the separator plate is disposed between the cathode plate and the anode plate.

8. The lithium secondary battery according to claim 1, wherein one or more unit cells are stacked such that electrode plates having opposite polarities face each other in a state in which the separation film is disposed between the electrode plates in a direction opposite to the height direction symmetrically or asymmetrically to the unit cells stacked in the height direction on the basis of the plane.

9. The lithium secondary battery according to claim 1, wherein the stair-like structure is formed at the electrode tab non-formation region.

10. The lithium secondary battery according to claim 1, wherein each of the electrode plates is formed in the shape of a parallelepiped having an overall width corresponding to a length of an electrode tab formation region, an overall length corresponding to a length of the electrode tab non-formation region, and an overall height corresponding to a height of each of the electrode plates.

11. The lithium secondary battery according to claim 10, wherein each of the electrode plates is formed in the shape of a rectangular parallelepiped having the overall width smaller than the overall length, and the overall height smaller than the overall width.

12. The lithium secondary battery according to claim 10, wherein each of the electrode plates is formed in the shape of a rectangular parallelepiped having the overall length and the overall width equal to each other and the overall height smaller than the overall width.

13. The lithium secondary battery according to claim 10, wherein each of the electrode plates is formed in the shape of a regular hexahedron having the overall length, the overall width, and the overall height equal to one another.

14. The lithium secondary battery according to claim 10, wherein at least one corner of each of the electrode plates is curved.

15. The lithium secondary battery according to claim 1, wherein the electrode assembly includes at least one additional stair-like structure, the stair-like structures having the same step heights and different widths.

16. The lithium secondary battery according to claim 15, wherein the width, the height, or the width and the height is configured based on curvature of a device in which a battery cell having the electrode assembly mounted therein is installed.

17. The lithium secondary battery according to claim 1, wherein an end of the separation film is fixed by thermal welding or taping in a state in which the stacked electrode groups are covered by the separation film.

18. The lithium secondary battery according to claim 1, wherein the electrode assembly includes at least one additional stair-like structure, the stair-like structures having different widths and heights.

19. A device comprising one or more lithium secondary batteries according to claim 1 as a power source.

20. The device according to claim 19, wherein the device is selected from among a mobile phone, a portable computer, a smartphone, a smart pad, a netbook computer, a light electronic vehicle, an electric vehicle, a hybrid electric vehicle, a plug-in hybrid electric vehicle, and a power storage unit.

21. The lithium secondary battery according to claim 1, wherein the unit cells are stacked in the shape of a frustum of a quadrangular pyramid.

22. The lithium secondary battery according to claim 1, wherein the unit cells are stacked in the shape of a frustum of an octagonal pyramid.

* * * * *